United States Patent
White et al.

(10) Patent No.: US 7,075,748 B2
(45) Date of Patent: Jul. 11, 2006

(54) DISK DRIVE WITH A DUAL-STAGE ACTUATOR AND FAILURE DETECTION AND RECOVERY SYSTEM FOR THE SECONDARY ACTUATOR

(75) Inventors: Matthew T. White, Mountain View, CA (US); Satoshi Yamamoto, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 115 days.

(21) Appl. No.: 10/997,153

(22) Filed: Nov. 24, 2004

(65) Prior Publication Data

US 2006/0109586 A1    May 25, 2006

(51) Int. Cl.
    *G11B 5/596* (2006.01)
(52) U.S. Cl. .................................... 360/78.05
(58) Field of Classification Search ............. 360/78.05, 360/46, 48, 51, 55, 63, 75, 77.02, 77.04, 360/78.07, 78.08, 78.09, 78.12, 105, 106, 360/31, 71, 77.08, 265.1
See application file for complete search history.

(56) References Cited

U.S. PATENT DOCUMENTS

| | | | | |
|---|---|---|---|---|
| 4,237,504 | A * | 12/1980 | Ho et al. ................. | 360/265.1 |
| 4,814,909 | A * | 3/1989 | Brown et al. ............ | 360/78.07 |
| 5,005,089 | A * | 4/1991 | Thanos et al. ........... | 360/77.08 |
| 5,936,805 | A | 8/1999 | Imaino | |
| 5,959,808 | A | 9/1999 | Fan et al. | |
| 6,005,742 | A * | 12/1999 | Cunningham et al. ... | 360/78.05 |
| 6,493,176 | B1 * | 12/2002 | Deng et al. .............. | 360/78.05 |
| 6,611,399 | B1 | 8/2003 | Mei et al. | |
| 6,798,610 | B1 * | 9/2004 | Deng et al. .............. | 360/78.05 |
| 6,975,477 | B1 * | 12/2005 | Hu et al. ....................... | 360/71 |
| 6,975,481 | B1 * | 12/2005 | Oswald et al. ........... | 360/78.05 |
| 6,975,482 | B1 * | 12/2005 | Guo et al. ................ | 360/78.05 |
| 7,031,099 | B1 * | 4/2006 | Kohso et al. ............ | 360/78.05 |
| 2004/0160693 | A1 * | 8/2004 | Meyer ......................... | 360/31 |
| 2004/0160696 | A1 * | 8/2004 | Meyer ..................... | 360/77.05 |
| 2005/0068657 | A1 * | 3/2005 | Yamamoto ................... | 360/75 |
| 2005/0068658 | A1 * | 3/2005 | Yamamoto ................... | 360/75 |

OTHER PUBLICATIONS

L.S. Fan et al., "Electrostatic Microactuator and Design Considerations for HDD Applications", IEEE Transactions on Magnetics, vol. 35, No. 2, Mar. 1999, pp. 1000-1005.

(Continued)

*Primary Examiner*—Fred F. Tzeng
(74) *Attorney, Agent, or Firm*—Thomas R. Berthold

(57) ABSTRACT

A dual-stage actuator disk drive has calibration tracks located in a nondata band, and uses a secondary-actuator failure detection and calibration test run by the servo control processor. The calibration tracks contain a pattern of pre-written magnetized test blocks. The test is run with the primary actuator biased against a crash stop, which enables the read head to access the calibration tracks. The servo control processor generates a test signal to the secondary actuator and receives a calibration signal from the read head as the read head detects the test blocks in the calibration tracks. The test comprises two measurements: a measurement of the secondary actuator static characteristics, and a measurement of the secondary actuator dynamic characteristics.

41 Claims, 17 Drawing Sheets

OTHER PUBLICATIONS

Y. Lou et al., "Dual-Stage Servo With On-Slider PZT Microactuator for Hard Disk Drives", IEEE Transactions on Magnetics, vol. 38, No. 5, Sep. 2002, pp. 2183-2185.

T. Semba et al., "Dual-stage servo controller for HDD using MEMS microactuator", IEEE Transactions on Magnetics, vol. 35, Sep. 1999, pp. 2271-2273.

* cited by examiner

READ BACK SIGNAL AMPLITUDE AT EACH BURST POSITION

SELECT 3 CONSECUTIVE BURST THAT HAVE THE LARGEST AMPLITUDE, SUCH AS Bn-1, Bn AND Bn+1

$$\text{HEAD POSITION} = n + \frac{V_{n+1} - V_{n-1}}{2 \ast (2 \ast V_n - V_{n-1} - V_{n+1})}$$

WHERE $V_{n-1}$, $V_n$, $V_{n+1}$ ARE AMPLITUDES OF BURST n-1, n AND n+1, RESPECTIVELY

DISK DRIVE WITH A DUAL-STAGE ACTUATOR AND FAILURE DETECTION AND RECOVERY SYSTEM FOR THE SECONDARY ACTUATOR

BACKGROUND OF THE INVENTION

1. Field of the Invention

This invention relates generally to magnetic recording hard disk drives, and more particularly to a disk drive with a dual-stage actuator for positioning the read/write heads.

2. Description of the Related Art

Magnetic recording hard disk drives with dual-stage actuators for positioning the read/write heads on the disks have been proposed. A rotary voice-coil-motor (VCM) is typically the primary actuator, with the secondary actuator attached to the VCM and the read/write heads attached to the secondary actuator. A servo control system receives servo positioning information read by the read/write heads from the data tracks and generates control signals to the primary and secondary actuators to maintain the heads on track and move them to the desired tracks for reading and writing of data. As in conventional single-stage actuator disk drives, each read/write head is attached to the end of a head carrier or air-bearing slider that rides on a cushion or bearing of air above the rotating disk. The slider is attached to a relatively flexible suspension that permits the slider to "pitch" and "roll" on the air bearing, with the suspension being attached to the end of the VCM actuator arm. The secondary actuator is typically a piezoelectric or electrostatic milliactuator or microactuator located on the VCM actuator arm for driving the suspension, or on the suspension between the suspension and the slider for driving the slider, or on the slider for driving just the read/write head.

The conventional servo control system for a typical dual-stage actuator disk drive uses a controller designed to assure stability of the VCM with adequate stability margins as if it were to operate without the secondary actuator. Then the controller for the secondary actuator is designed to achieve the desired combined dual-stage bandwidth. The secondary actuator control loop and the combined dual-stage control loop are also designed to ensure adequate stability separately and jointly with the other control loops. This type of servo control system is satisfactory for limited increases in the bandwidth above what is achievable with only the VCM.

In co-pending application Ser. No. 10/802,601 filed Mar. 16, 2004, titled "MAGNETIC RECORDING DISK DRIVE WITH DUAL-STAGE ACTUATOR AND CONTROL SYSTEM WITH MULTIPLE CONTROLLERS", and assigned to the same assignee as this application, a dual-stage actuator disk drive is described that operates with an improved servo control system that has two controllers. One controller is a dual-stage controller that simultaneously generates a primary actuator control signal and a secondary actuator control signal, and uses a degraded-stability primary actuator controller design with relatively high low-frequency open-loop gain and a secondary actuator controller design that provides stability and high mid-frequency to high-frequency open-loop gain resulting in increased bandwidth. The other controller is a single-stage controller that generates only a primary actuator control signal and uses a stable VCM-only controller design. If a potential failure of the secondary actuator is detected, the servo control system selects the single-stage controller.

In dual-stage actuator disk drives with either the conventional servo control system or the control system of the co-pending application, a failure of the secondary actuator will result in reduced performance and may lead to loss of data and/or failure of the disk drive.

What is needed is a dual-stage actuator disk drive that can detect actual failure of the secondary actuator and modify the controller parameters if the failure is recoverable.

SUMMARY OF THE INVENTION

The invention is a dual-stage actuator disk drive that has calibration tracks located outside the data region, such as in a nondata band beyond the inside diameter of the data band, and uses a secondary-actuator failure detection and calibration test that is run by the servo control processor. The calibration tracks contain a pattern of pre-written magnetized test blocks that can be accessed and detected by the read head when the primary actuator is biased against a crash stop. The servo control processor runs a secondary-actuator failure detection and calibration test, which can be performed on a regular schedule or at selected times, such as at disk drive start-up. The test is run with the primary actuator biased against a crash stop, which enables the read head to access the calibration tracks but not the data tracks. The servo control processor generates a test signal to the secondary actuator and receives a calibration signal from the read head as the read head detects the test blocks in the calibration tracks.

The test comprises two measurements: a measurement of the secondary actuator static characteristics, and a measurement of the secondary actuator dynamic characteristics. In both measurements, the read head signal amplitude from the test block pattern is used to measure the secondary actuator movement across the calibration tracks.

The static characteristics measurement is a calculation of the secondary actuator "stroke", i.e., the amount of head radial movement across the calibration tracks as a function of voltage input to the secondary actuator, and a comparison of the calculated stroke to a predetermined range of acceptable stroke values. With the primary actuator biased against the crash stop, a first test signal is applied to the secondary actuator and the read head movement is measured using the read head signal from the test block pattern. The secondary actuator stroke resulting from the test signal is calculated from several position measurements. These measurements are averaged over several disk rotations. If the calculated stroke is outside the acceptable range, then this is an indicator that the secondary actuator has likely failed.

If the calculated stroke is within the acceptable range, then the dynamic characteristics measurement is made. This measurement is essentially a measurement of the plant frequency response of the secondary actuator. With the primary actuator biased against the crash stop, a second test signal is applied to the secondary actuator and the read head movement is recorded. The second test signal for the dynamic characteristics measurement is a series of test signals, each a sinusoidal signal at a constant frequency. The read head position is measured at each calibration sector during the application of the constant frequency test signal, and the resulting gain and phase of the read head response are recorded along with the corresponding frequency. This is repeated for each frequency in the series of test signals. This enables the plant frequency response of the secondary actuator to be measured. If the response is significantly different from the expected response, it is virtually assured that the secondary actuator has failed. If the measured frequency response shows minor changes, such as a minor increase or decrease in the gain, or a minor shift in the frequency at which the maximum gain occurs, the controller parameters are adjusted or re-optimized. This re-optimization changes the values of the controller parameters in the memory accessible by the servo control processor. The parameters that can be changed include parameters that affect bandwidth or stability margins, notching of particular frequencies such as the secondary actuator resonant frequency, active damping of the secondary actuator resonance, or other performance, robustness, or stability metrics.

The invention is applicable to both the dual-stage actuator disk drive with a servo control system having a conventional dual-stage controller, and the dual-stage actuator disk drive according to the previously-cited co-pending application that has both a dual-stage controller and a selectable single-stage controller.

In the dual-stage actuator disk drive according to the co-pending application, a potential failure of the secondary actuator is detected either by providing a model of the dynamic response of the primary and secondary actuators and comparing the modeled head-position with the measured head-position, or by measuring the position of the secondary actuator relative to the primary actuator with a relative-position sensor and comparing the relative position to a modeled position of the secondary actuator. Upon detection of a potential failure of the secondary actuator, the single-stage controller is selected, the primary actuator is moved to the crash stop, and the secondary-actuator failure detection and calibration test is run. If the secondary actuator passes both the static characteristics measurement test and the dynamic characteristics measurement test, then the dual-stage controller is re-selected. If the measured frequency response shows minor changes from the optimized frequency response, the controller parameters are adjusted or re-optimized prior to re-selection of the dual-stage controller.

For a fuller understanding of the nature and advantages of the present invention, reference should be made to the following detailed description taken together with the accompanying figures.

DETAILED DESCRIPTION OF THE INVENTION

Prior Art

Figure 1:
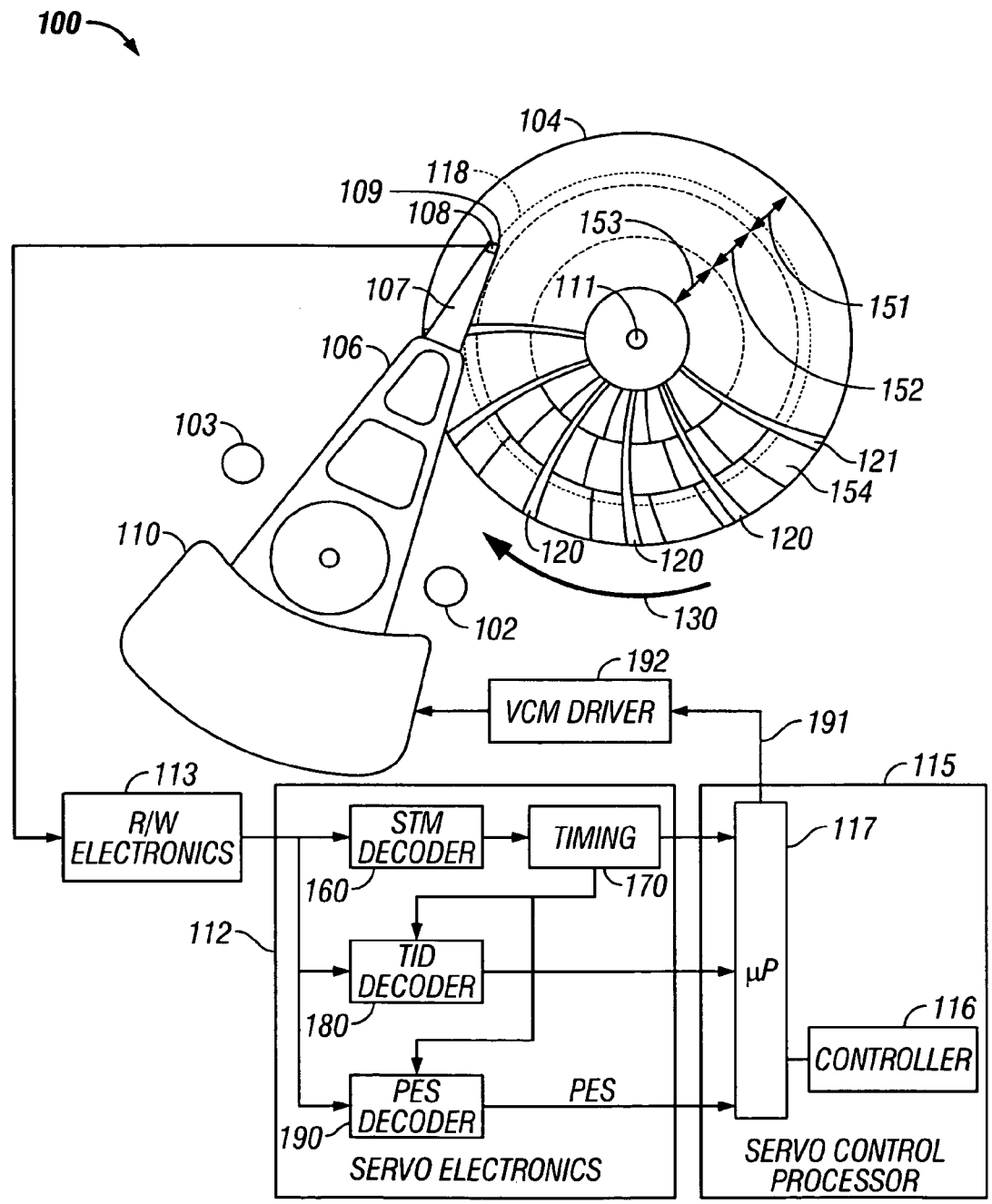
FIG. 1 is a block diagram of a prior art single-stage actuator disk drive.

FIG. 1 is a block diagram of a conventional single-stage actuator disk drive that uses servo positioning information located in angularly-spaced servo sectors for positioning the read/write heads. The disk drive, designated generally as 100, includes data recording disk 104, a voice coil motor (VCM) 110 as the primary and only actuator, an inner-diameter (ID) crash stop 102 and an outer-diameter (OD) crash stop 103 for the VCM 110, an actuator arm 106, a suspension 107, a head carrier or air-bearing slider 108, a data recording transducer 109 (also called a head, recording head or read/write head), read/write electronics 113, servo electronics 112, and servo control processor 115.

The recording head 109 may be an inductive read/write head or a combination of an inductive write head with a magnetoresistive read head and is located on the trailing end of slider 108. Slider 108 is supported on the actuator arm 106 by a suspension 107 that enables the slider to "pitch" and "roll" on an air-bearing generated by the rotating disk 104. Typically, there are multiple disks stacked on a hub that is rotated by a-disk motor, with a separate slider and recording head associated with each surface of each disk.

Data recording disk 104 has a center of rotation 111 and is rotated in direction 130. The disk 104 has a magnetic recording layer with radially-spaced concentric data tracks, one of which is shown as track 118. The disk drive in FIG. 1 is illustrated as a zone-bit-recording (ZBR) disk drive because the data tracks are grouped radially into a number of annular data zones or bands, three of which are shown as bands 151, 152 and 153, but the invention is fully applicable to a disk drive that does not use ZBR, in which case the disk drive would have only a single data band. The range of rotation of the VCM is between the ID crash stop 102 and the OD crash stop 103, which define the ID and OD of the annular region where data can be written. Each data track has a reference index 121 indicating the start of track. Within each band, the tracks are also circumferentially divided into a number of data sectors 154 where user data is stored. If the disk drive has multiple heads, then the set of tracks which are at the same radius on all disk recording layers is referred to as a "cylinder".

Each data track also includes a plurality of circumferentially or angularly-spaced servo sectors. The servo sectors in each track are aligned circumferentially with the servo sectors in the other tracks so that they extend across the tracks in a generally radial direction, as represented by radially-directed servo sections 120. The servo positioning information in each servo sector includes a servo timing mark (STM), a track identification (TID) code, and a portion of a pattern of magnetized blocks or high-frequency bursts that are decoded to provide a head position error signal (PES).

The servo positioning information in the servo sectors is read by the read/write electronics 113 and signals are input to the servo electronics 112. The servo electronics 112 provides digital signals to servo control processor 115. The servo control processor 115 provides an output 191 to VCM driver 192 that controls current to the VCM 110 to position the head 109.

Within the servo electronics 112, the STM decoder 160 receives a clocked data stream from the read/write electronics 113. Once an STM has been detected, an STM found signal is generated. The STM found signal is used to adjust timing circuit 170, which controls the operating sequence for the remainder of the servo sector.

After detection of an STM, the track identification (TID) decoder 180 receives timing information from timing circuit 170, reads the clocked data stream, which is typically Gray-code encoded, and then passes the decoded TID information to servo control processor 115. Subsequently, the PES decoder 190 (also called the servo demodulator) captures the position information from read/write electronics 113 and passes a position error signal (PES) to servo control processor 115.

The servo control processor 115 includes a microprocessor 117 that uses the PES as input to a control algorithm to generate the control signal 191 to VCM driver 192. The control algorithm recalls from memory a "controller" 116, which is a set of parameters based on the static and dynamic characteristics of the "plant" being controlled, i.e., the VCM 110. The controller 116 is a "single-stage" controller because the disk drive being described has only a primary actuator, i.e., VCM 110, and servo control processor 115 provides only a single output, i.e., signal 191 to VCM driver 192. The control algorithm is essentially a matrix multiplication algorithm, and the controller parameters are coefficients used in the multiplication and stored in memory accessible by the microprocessor 117.

Figure 2:
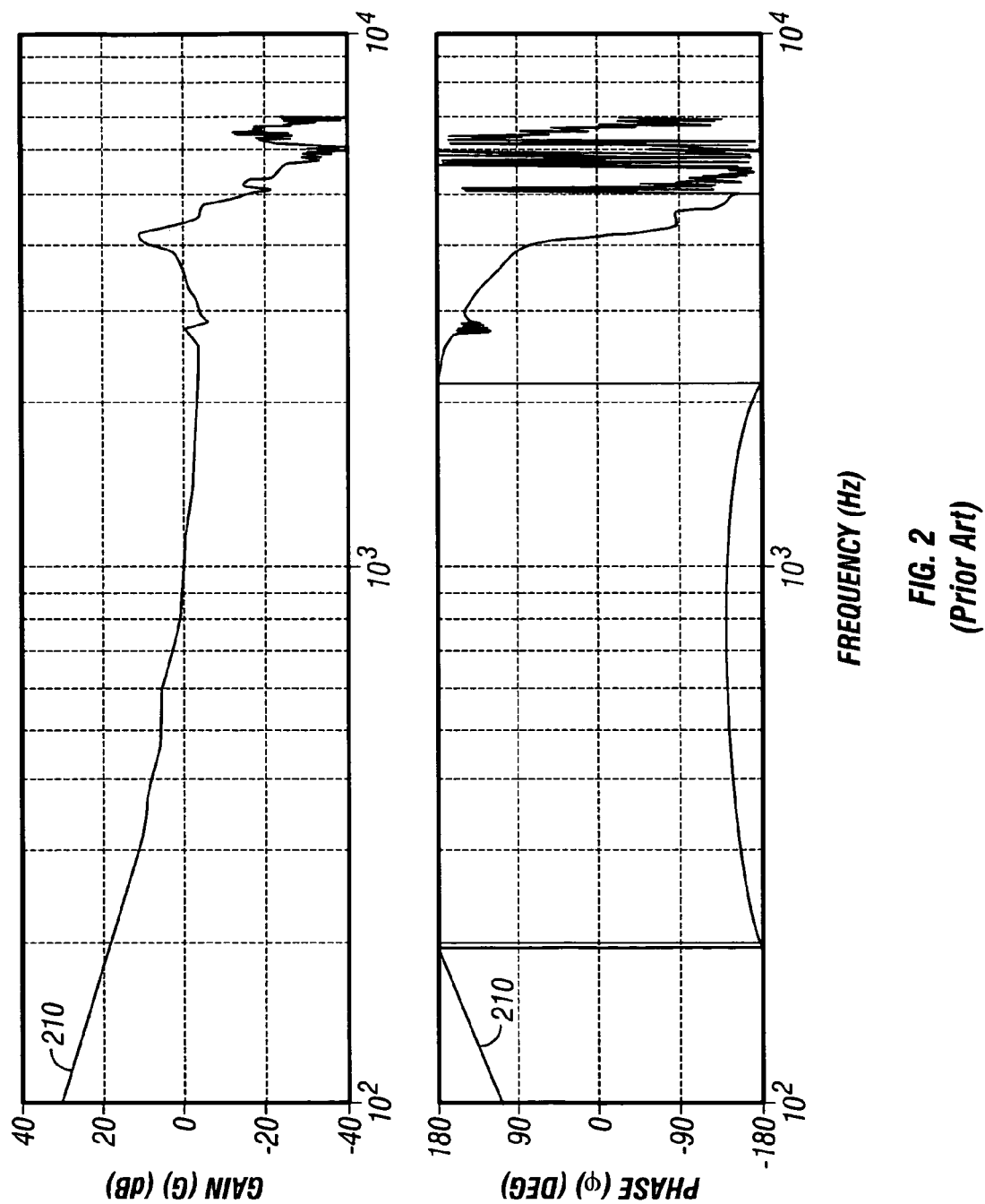
FIG. 2 is an open-loop frequency response for a prior art disk drive with only a single-stage actuator, typically a voice-coil-motor (VCM).

The method of designing the controller 116 is well-known in the digital servo control and disk drive servo control literature. The controller can be designed in the frequency domain to achieve the desired open-loop input-output frequency response of the VCM 110. The input-output behavior of a dynamic system at any frequency can generally be expressed by two parameters, the gain (G) and the phase ($\phi$) representing the amount of attenuation/magnification and phase-shift, respectively. The gain and phase of a dynamic system represent the frequency response of the system and can be generated by experiment. In disk drive single-stage servo control systems the controller 116 must be a stable design. FIG. 2 is an example of an open-loop frequency response 210 for a disk drive with only a single-stage actuator, i.e., VCM 110. The single-stage controller 116 for this system assures stability. For example, at the gain zero-crossover, the phase margin is about 30 degrees and at −180 degree phase the gain margin is about 5 dB. Also, at a natural resonance near 4 kHz, the phase is near zero such that the system is phase stable.

Figure 3:
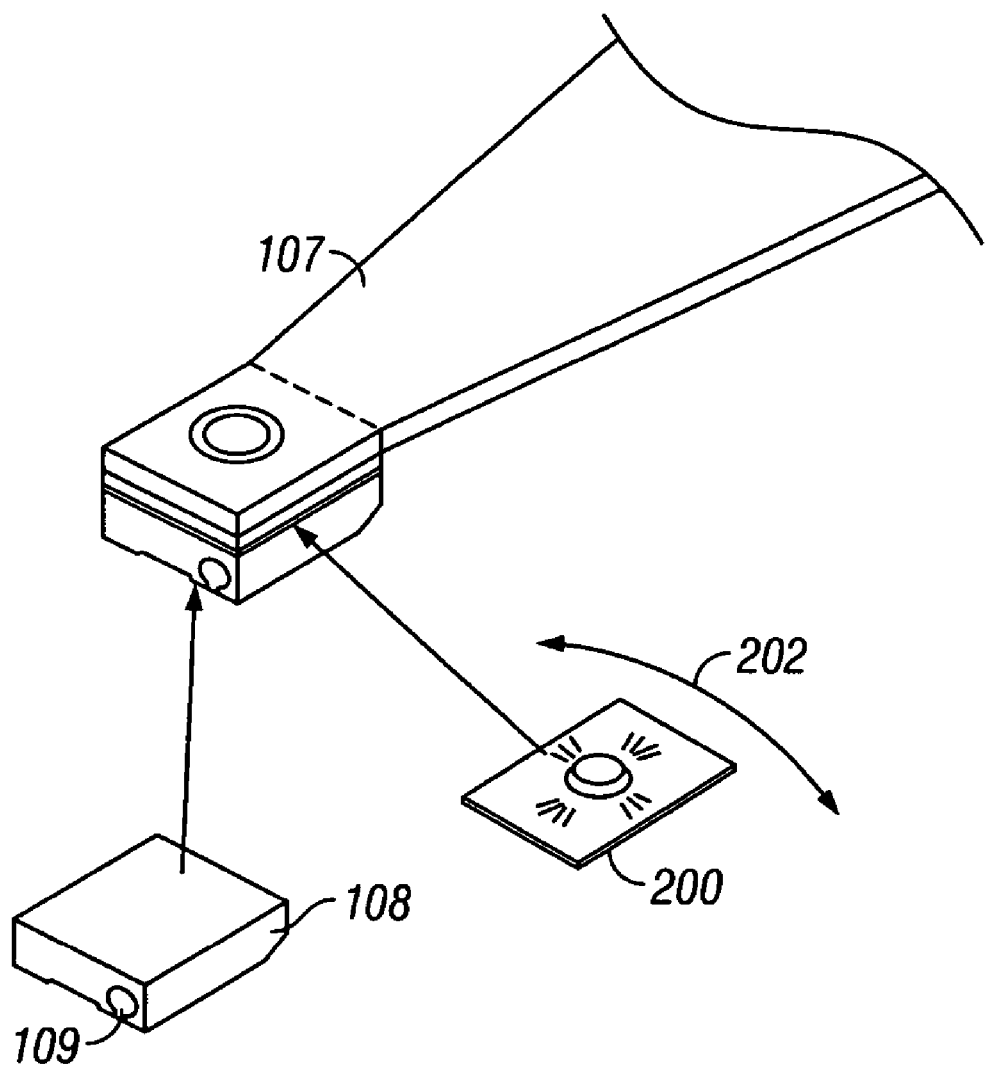
FIG. 3 is a view of a secondary actuator usable with the above-described prior art disk drive.

FIG. 3 shows one example of a secondary actuator usable with the above-described disk drive. The secondary actuator is an electrostatic rotary microactuator 200 located between the slider 108 and the suspension 107. This type of microactuator is described in detail in U.S. Pat. No. 5,959,808 and L. S. Fan et al., "Electrostatic Microactuator and Design Considerations for HDD Applications", *IEEE Transactions on Magnetics,* Vol. 35, No. 2, March 1999, pp. 1000–1005. Rotation of the microactuator 200 as represented by arrow 202 causes rotation of the slider 108 and thus movement of head 109 in the cross-track direction. The microactuator 200 maintains the head 109 on-track, while the VCM 110 moves the slider 108 (and thus head 109) across the tracks. Other types of secondary actuators are also well-known, such as piezoelectric-based actuators. Also, the secondary actuator may be located on the suspension or actuator arm to move a suspension or arm-section relative to the fixed actuator arm, as in U.S. Pat. No. 5,936,805, or between the slider and a slider-segment to move the head relative to the slider, as in U.S. Pat. No. 6,611,399.

Figure 4:
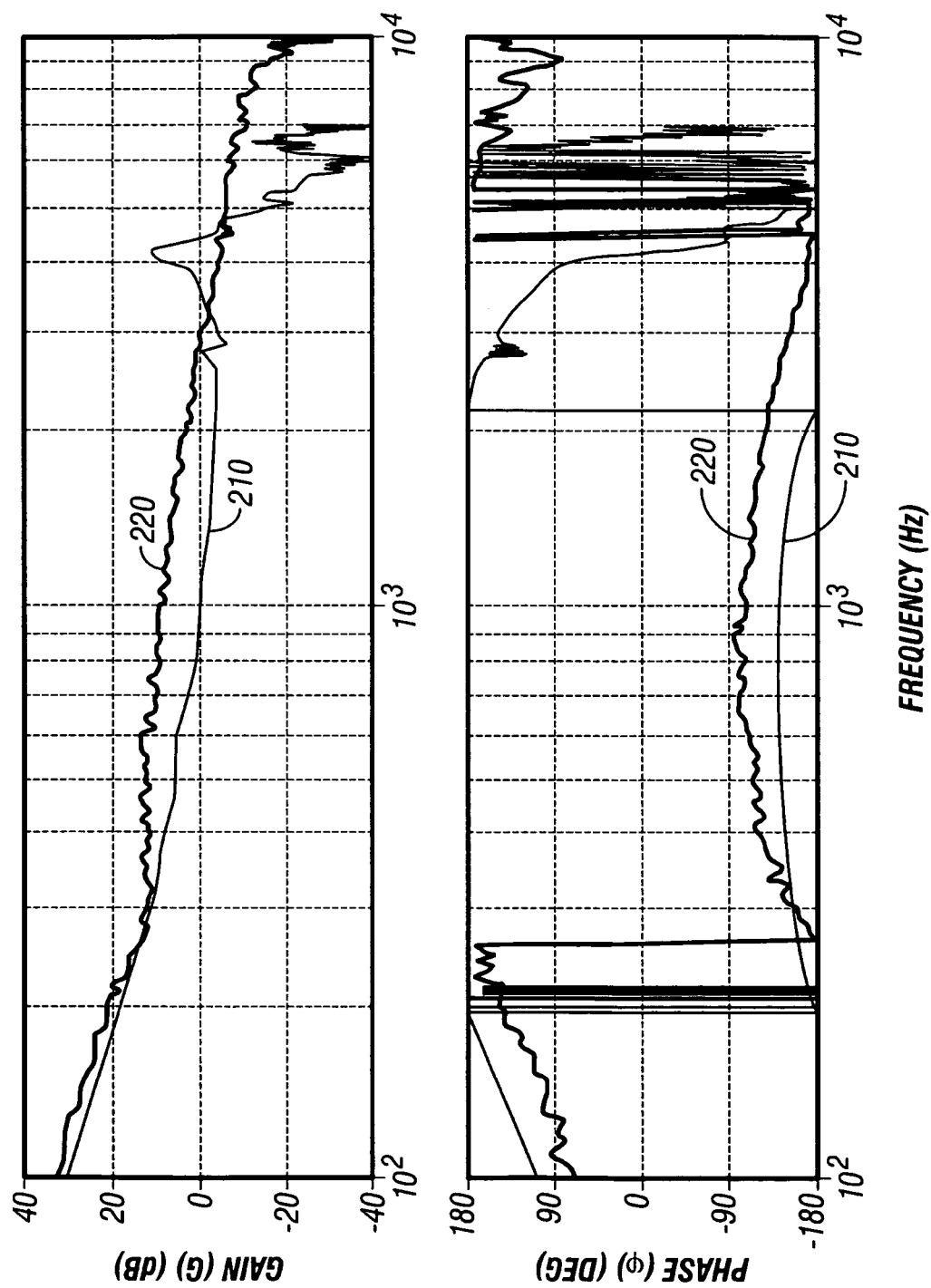
FIG. 4 is a comparison of an open-loop frequency response for a prior art disk drive with a dual-stage actuator with a stable VCM controller design and the open-loop frequency response of FIG. 2.

The conventional control system for a disk drive with a dual-stage actuator is similar to that described above except that there is a second output from the servo control processor that is sent to the driver for the secondary actuator, and the controller is a dual-stage controller. In the dual-stage control system, the VCM or primary actuator is typically responsible for large-amplitude, low-frequency motion and the microactuator or secondary actuator is typically responsible for small-amplitude, high-frequency motion. The design of a dual-stage controller for a hard disk drive dual-stage servo control systems is well-known, as described for example, in Y. Lou et al., "Dual-Stage Servo With On-Slider PZT Microactuator for Hard Disk Drives", *IEEE Transactions on Magnetics,* Vol. 38, No. 5, September 2002, pp. 2183–2185; and T. Semba et al., "Dual-stage servo controller for HDD using MEMS microactuator", *IEEE Transactions on Magnetics,* Vol. 35, September 1999, pp. 2271–2273. Generally, the design of a dual-stage controller starts with the VCM controller, typically with a design that is very similar to a single-stage VCM controller, such as the design for the VCM controller whose open-loop frequency response 210 is shown in FIG. 2. In particular, the stability of the VCM is assured with adequate robustness or stability margins as if it were to operate without the secondary actuator. Then the controller for the secondary actuator is designed to achieve the desired combined dual-stage bandwidth. The secondary actuator control loop and the combined dual-stage control loop are also designed to ensure adequate stability separately and jointly with the other control loops. This process is satisfactory for limited increases in the bandwidth above what is achievable with only the VCM. An example of an open-loop frequency response for a dual-stage hard disk drive with a conventional stable VCM controller design is shown as frequency response 220 in FIG. 4 and compared with the frequency response 210, which is also shown FIG. 2. The response 220 is similar to response 210 at low frequencies, but has higher gain in the mid-frequency range, and a higher bandwidth. For disk drives in general and for the frequency responses described herein, the low frequency range is generally meant to be below approximately 300 Hz, the mid frequency range is generally meant to be approximately 300 Hz to 2 kHz, and the high frequency range is generally meant to be above approximately 2 kHz. However, the boundaries between what are considered low, mid, and high frequency ranges are more accurately linked to where the microactuator begins to dominate the overall frequency response and the open loop bandwidth (0 dB crossover) achievable with a single-stage actuator. This is strongly related to the physical size of the disk drive.

The Invention

In a dual-stage actuator disk drive as described above, failure of the secondary actuator will result in reduced performance and may lead to loss of data and/or failure of the disk drive. Thus it is important to be able to detect actual failure of the secondary actuator and re-optimize the controller parameters if the failure is recoverable.

This invention is a disk drive that has calibration tracks located outside the data region, such as in a nondata band just beyond the ID or OD of the data band, and uses a secondary-actuator failure-detection and calibration test run by the servo control processor. The calibration tracks contain a pattern of pre-written magnetized test blocks that can be accessed and detected by the read head when the VCM is biased against the crash stop. The servo control processor runs a secondary-actuator failure detection and calibration test, which can be performed on a regular schedule or at selected times, such as at disk drive start-up. The test is run with the VCM biased against a crash stop, preferably the ID crash stop, which enables the read head to access the calibration tracks but not the data tracks. The servo control processor generates a test signal to the secondary actuator and receives a calibration signal from the read head as the read head detects the test blocks in the calibration tracks.

The test comprises two measurements: a measurement of the secondary actuator static characteristics, and a measurement of the secondary actuator dynamic characteristics. In both measurements, the read head signal amplitude from the test block pattern is used to measure the secondary actuator movement.

The static characteristics measurement is a calculation of the secondary actuator "stroke", i.e., the amount of head radial movement across the calibration tracks as a function of voltage input to the secondary actuator, and a comparison of the calculated stroke to a predetermined range of acceptable stroke values. With the VCM fixed against the ID crash stop, a first test signal is applied to the secondary actuator and the read head movement is measured using the read head signal from the test block pattern. The secondary actuator stroke resulting from the test signal is calculated from several position measurements. These measurements are averaged over several disk rotations. If the calculated stroke is outside the acceptable range, then this is an indicator that the secondary actuator has likely failed.

The dynamic characteristics measurement is essentially a measurement of the plant frequency response of the secondary actuator. With the VCM fixed against the ID crash stop, a second test signal is applied to the secondary actuator and the read head movement is recorded. The test signal for the dynamic characteristics measurement is a series of test signals, each a sinusoidal signal at a constant frequency. The read head position is measured at each calibration sector during the application of the constant frequency test signal, and the resulting gain and phase of the read head response are recorded along with the corresponding frequency. This is repeated for each frequency in the series of test signals. This enables the plant frequency response of the secondary actuator to be measured. If the response is significantly different from the expected response, it is virtually assured that the secondary actuator has failed. If the measured frequency response shows minor changes, such as a minor increase or decrease in the gain, or a minor shift in the frequency at which the maximum gain occurs, the controller parameters are adjusted or re-optimized. This re-optimization changes the values of the controller parameters in the memory accessible by the servo control processor. The parameters that can be changed include parameters that affect bandwidth or stability margins, notching of particular frequencies such as the secondary actuator resonant frequency, active damping of the secondary actuator resonance, or other performance, robustness, or stability metrics.

While the invention is fully applicable to a dual-stage actuator disk drive with a servo control system having a conventional dual-stage controller as described above, the invention will be described in detail below as implemented in the dual-stage actuator disk drive with the improved servo control system of the previously-cited co-pending application.

Figure 5:
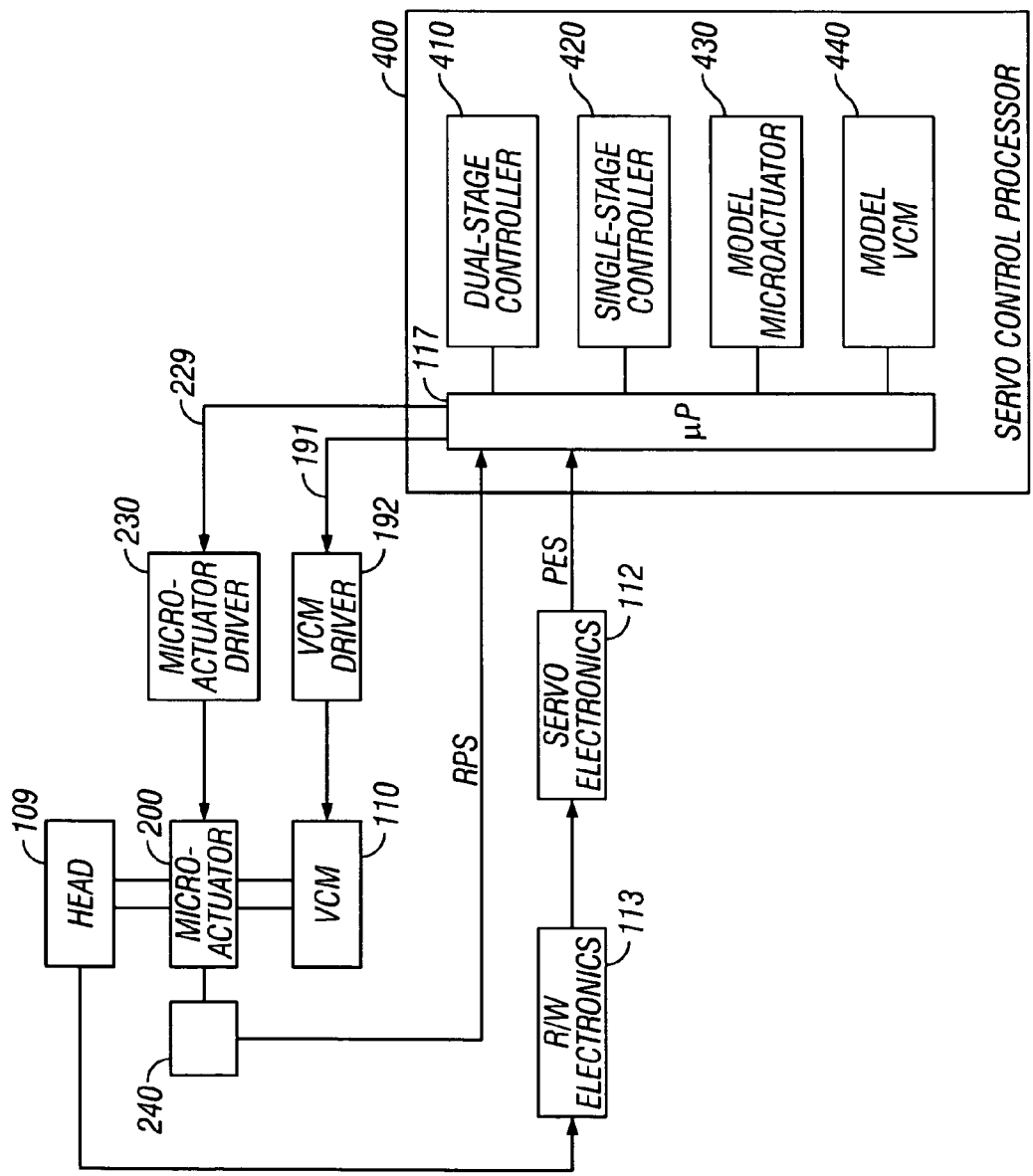
FIG. 5 is a block diagram of a disk drive with a dual-stage actuator and control system according to this invention.

FIG. 5 is a block diagram of the control system of the present invention for a dual-stage hard disk drive. The head 109 reads the servo pattern from the disk, the read/write electronics 113 processes the signal from the head 109, and the servo electronics 112 generates the PES from the signals from read/write electronics 113, all as described in the prior art.

The servo control processor 400 receives the PES from servo electronics 112, and provides a primary control signal 191 to VCM driver 192 and a secondary control signal 229 to microactuator driver 230. The servo control processor includes a microprocessor 117 and uses a dual-stage controller 410 to generate control signals 191, 229. The dual-stage controller 410 incorporates a degraded-stability VCM controller with relatively high low-frequency open-loop gain, and a secondary actuator controller providing stability to the dual-stage controller and high mid-to-high-frequency open-loop gain, resulting in increased bandwidth. However, if the microactuator 200 fails while the disk drive is under the control of dual-stage controller 410, then VCM 110 will become unstable. If the microactuator 200 fails then the servo control processor 400 switches to use of a single-stage stable controller 420 and generates only a primary control signal 191 to VCM driver 192. The single-stage controller 420 can be a VCM controller based on the frequency response 210 (FIG. 2) or any VCM controller that is stable without the microactuator 200. This stable VCM controller 420 will most likely have decreased performance, but will prevent catastrophic failure of the disk drive that would result in loss of data.

In the preferred embodiment, the detection of potential failure of microactuator 200 is by a microactuator relative-position sensor 240. The sensor 240 measures the displacement of microactuator 200 relative to VCM 110 and provides a relative-position signal (RPS) to servo control processor 400. If the secondary actuator is an electrostatic microactuator, then sensor 240 can be a capacitance sensing circuit, as described in M. T. White et al., "Use of the Relative Position Signal for Microactuators in Hard Disk Drives", *Proceedings of the American Control Conference,* Denver, Colo., Jun. 4–6, 2003, pp. 2535–2540.

Figure 6:
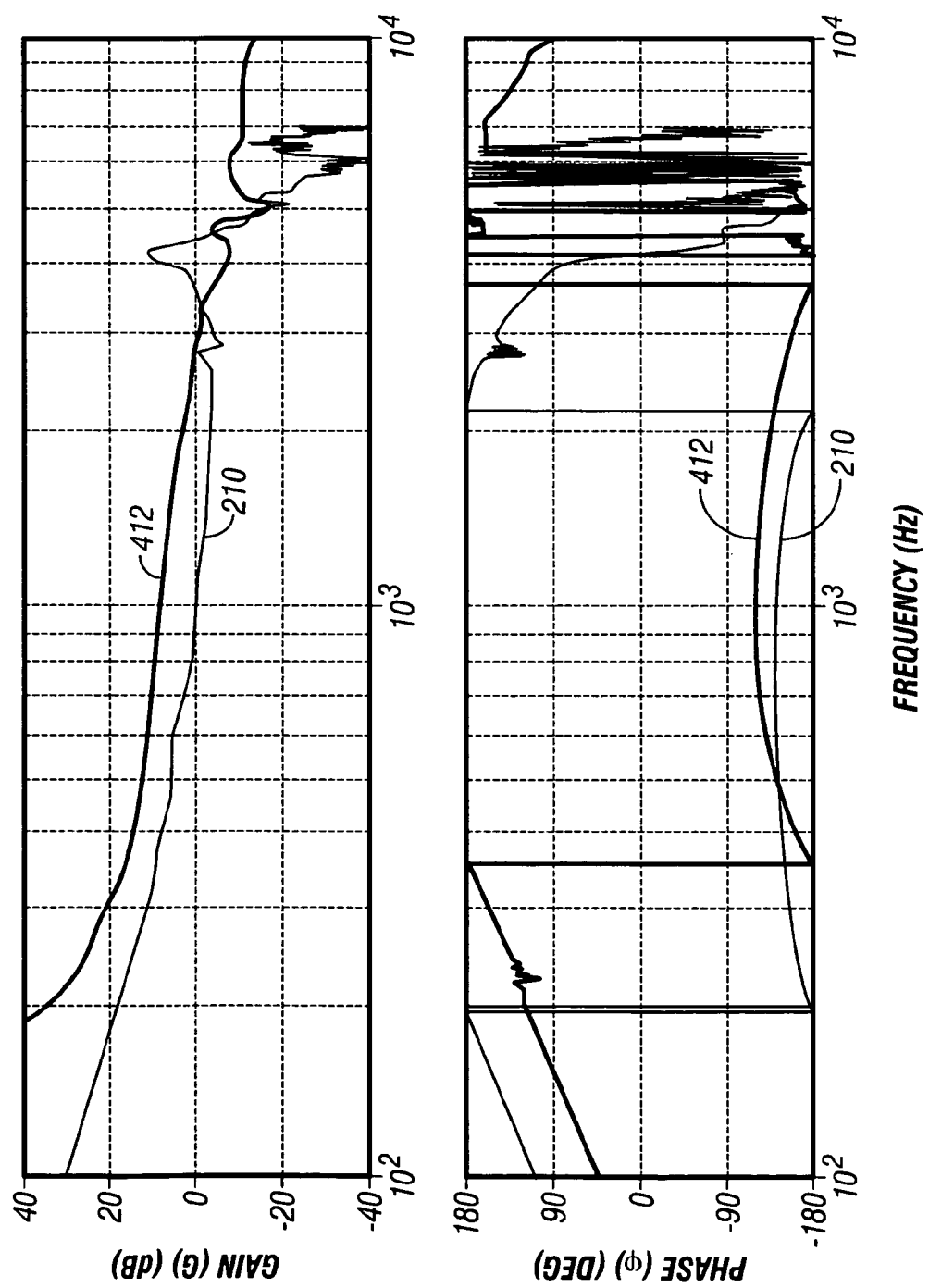
FIG. 6 is a comparison of the open-loop frequency response for the dual-stage controller with a degraded-stability VCM controller design according to this invention and the open-loop frequency response of FIG. 2.

FIG. 6 is the open-loop frequency response 412 for the dual-stage controller 410 with a degraded-stability VCM controller design compared with the frequency response 210 for the single-stage stable controller 420. As frequency response 412 shows, the low frequency gain may be increased by relaxing the stability requirements of the VCM, but at the expense of robustness. The resulting open-loop frequency response of the dual-stage system 412 has increased gain over a wider frequency compared to the open-loop frequency response of the dual-stage system 220 shown in FIG. 4. This will result in better disturbance rejection and performance. The frequency response of the dual-stage system 412 has gain and phase margins that are comparable to the frequency response of the single-stage system 210 in FIG. 2. The phase margin near 2.8 kHz is about 30 degrees and the gain margin near 3.8 kHz is about 5 dB.

Figure 7:
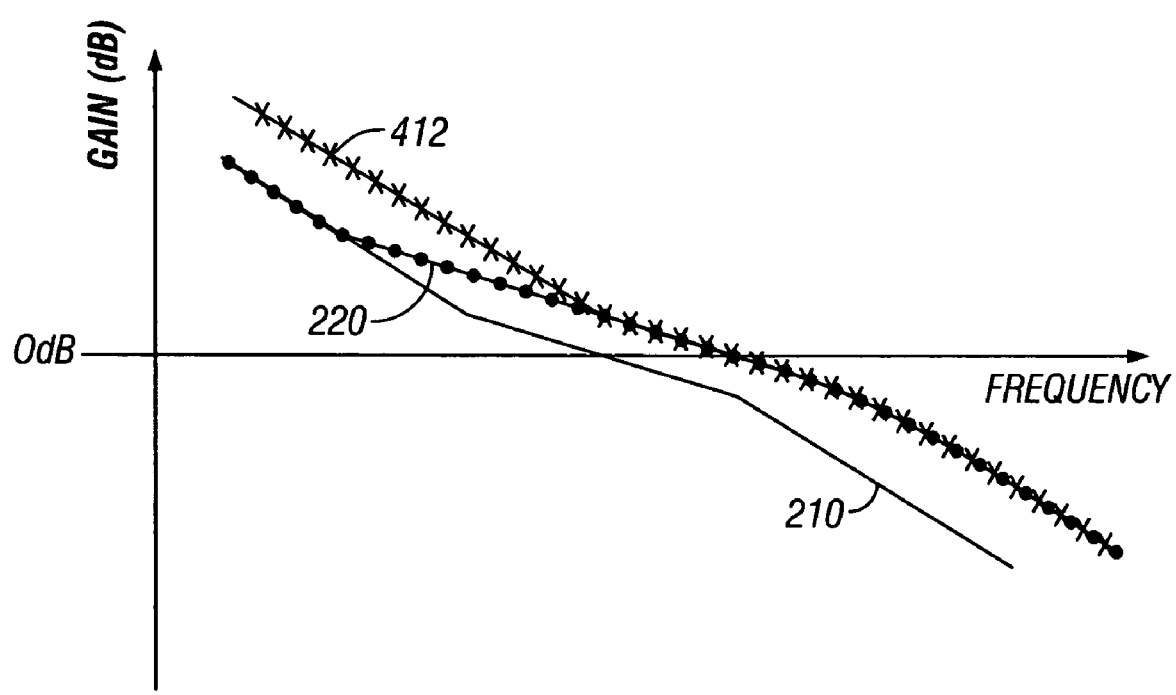
FIG. 7 shows the gain of the VCM open-loop frequency response for a stable single-stage VCM controller, the gain improvement with the addition of a secondary actuator, and the further gain improvement with the use of an increased-gain degraded-stability VCM controller and a secondary actuator.

FIG. 7 is the gain portion of three frequency responses and is a graphical explanation of the invention. Solid line 210 represents the gain of the VCM open-loop frequency response for a stable single-stage VCM controller. Dotted line 220 represents the improvement to response 210 with the addition of the secondary actuator (microactuator 200) and is the typical shape for a conventional dual-stage controller. It has increased bandwidth and increased gain in the mid-frequency range. This will result in improved disturbance rejection and faster response at these frequencies. However, because the low-frequency gain is still determined by the single-stage VCM controller, there is no improvement at low frequency. Cross-hatched line 412 represents the further improvement with the use of an increased-gain degraded-stability VCM controller and the secondary actuator. This response also has increased low-frequency gain, and is comparable in shape to the response for the VCM-only design, but shifted higher in frequency. However, increasing the low-frequency gain will also decrease the phase margin for the VCM controller, potentially to the point of instability of the VCM. The secondary actuator controller is then designed to make the combined system stable, as well as increasing the mid-frequency to high-frequency gain. Using the secondary actuator to ensure the stability of the combined system typically takes significantly less stroke than using the secondary actuator to increase the low-frequency gain, and is therefore a more efficient use of the limited secondary actuator stroke to achieve high bandwidth with adequate disturbance rejection.

With the dual-stage controller having the characteristics represented by line 412 in FIG. 7, failure of the secondary actuator results in an unstable system. This could lead to inoperability of the hard disk drive, or even failure with loss of data. This is avoided by detecting a potential failure of the secondary actuator and switching to a stable VCM-only controller. The potential failure of the secondary actuator is detected either by providing a model of the dynamic response of the primary and secondary actuators and comparing the modeled head-position with the measured head-position, or by measuring the position of the secondary actuator relative to the primary actuator with a relative-position sensor and comparing the relative position to a modeled position of the secondary actuator. In the present invention, after a potential failure of the secondary actuator has been detected and switching to the VCM-only controller has occurred, the secondary-actuator failure-detection and calibration test is run by the servo control processor.

Figure 8:
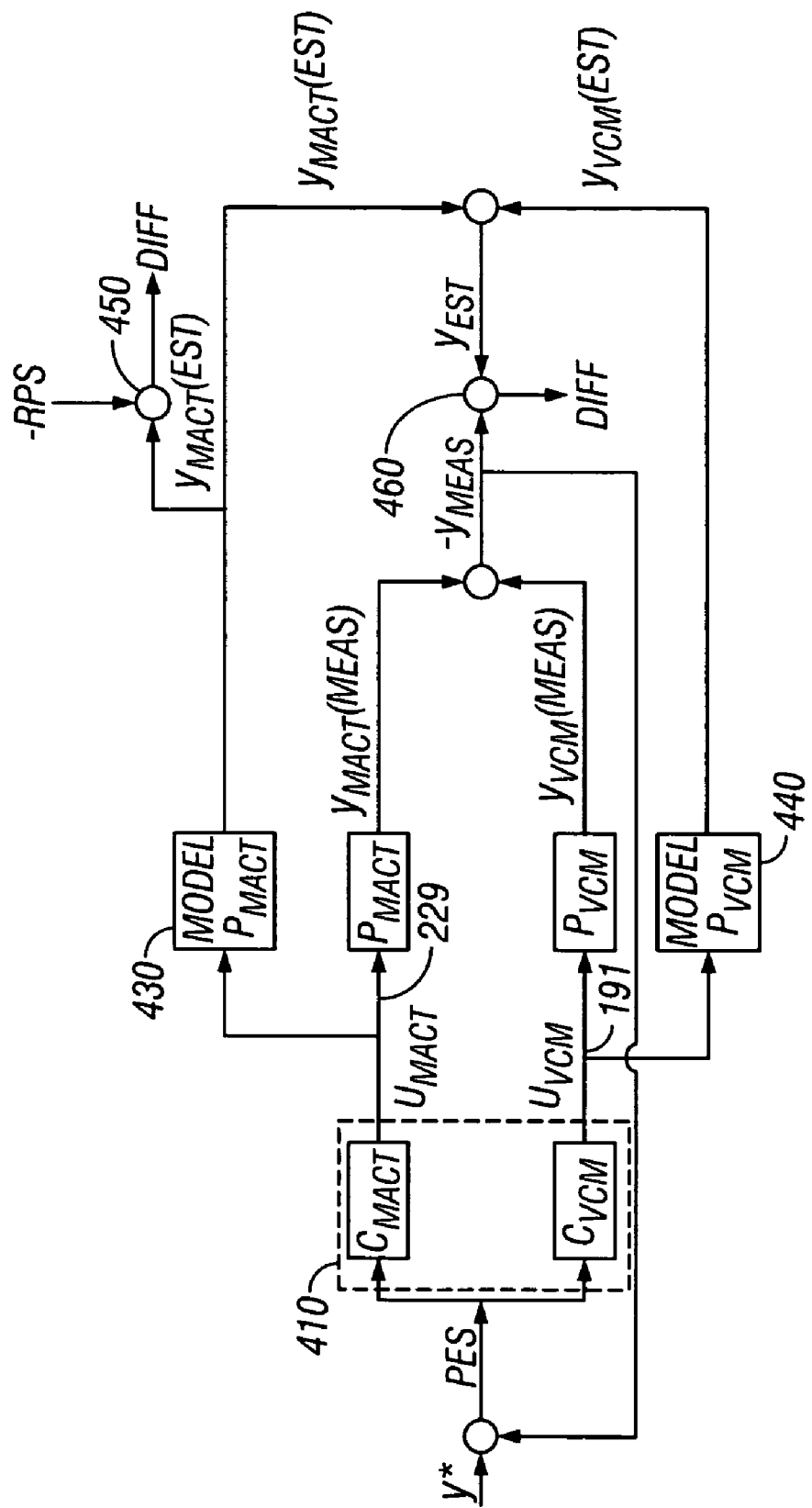
FIG. 8 is a schematic structure of the control system of this invention.

A schematic structure of the control system of the present invention is shown in FIG. 8. $C_{MACT}$ and $P_{MACT}$ represent the microactuator controller and plant, respectively, and $C_{VCM}$ and $P_{VCM}$ represent the VCM controller and plant, respectively. The controllers $C_{MACT}$ and $C_{VCM}$ together represent the dual-stage controller 410. The microprocessor 117 in servo control processor 400 (FIG. 5) runs the control algorithm using the parameters of controllers $C_{MACT}$ and $C_{VCM}$ and generates control signals $u_{MACT}$ and $u_{VCM}$ (229 and 191, respectively, in FIG. 5). The control system includes a model 430 of the microactuator plant and a model 440 of the VCM plant. These models may be determined from frequency response measurements of the microactuator and VCM, finite element models (FEM), or other well-known system identification techniques.

FIG. 8 shows two methods for determining potential failure of the microactuator 200. In the preferred method the calculated microactuator control signal $u_{MACT}$ is input to the microactuator model 430 and the estimated microactuator position $y_{MACT(EST)}$ from the model is compared to the RPS from sensor 240 at junction 450. In an alternative "PES-based" method the calculated microactuator control signal $u_{MACT}$ is input to the microactuator model 430 and the calculated VCM control signal $u_{VCM}$ is input to the VCM model 440. The modeled expected or estimated output $y_{EST}$ is then compared with the measured output $y_{MEAS}$ at junction 460.

Figure 9:
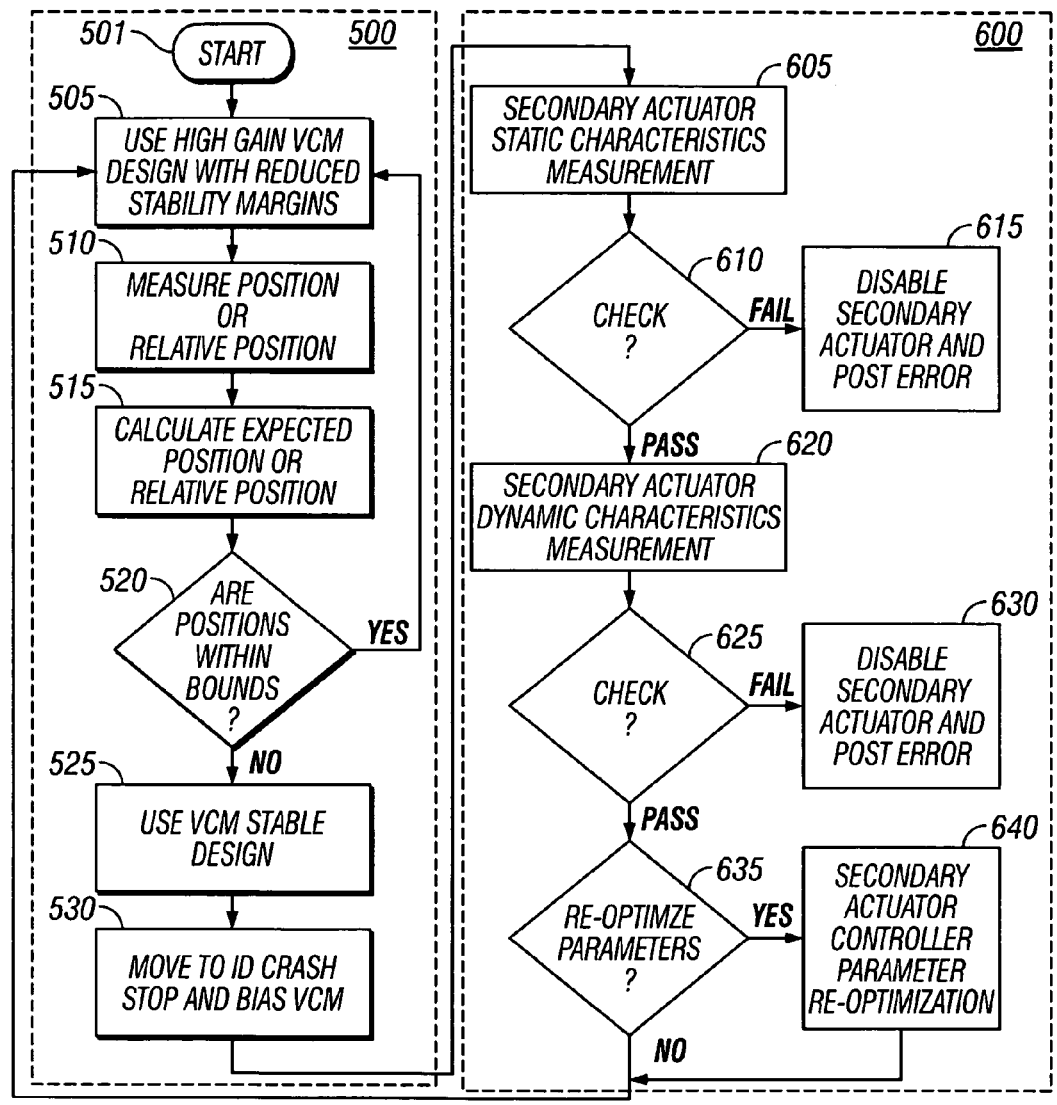
FIG. 9 is a flow chart for the operation of the disk drive of this invention.

FIG. 9 is a flow chart for the operation of the disk drive of the present invention. The flow chart portion 500 describes the method for detecting potential failure of the secondary actuator and switching to the VCM-only stable controller if potential failure is detected, and flow chart portion 600 describes the method for detecting actual failure of the secondary actuator and possible re-optimization of the controller parameters to enable switching back to the dual-stage controller having a degraded-stability VCM controller.

Referring first to portion 500, the control system starts (block 501) and continues to operate using the dual-stage controller 410 with the degraded-stability VCM controller (block 505). In block 510, the position of the head is measured ($y_{MEAS}$) if the PES-based method is used, or the relative position of microactuator 200 is measured (RPS) if the relative position sensing method is used. In block 515 the expected or estimated head position $y_{EST}$ is calculated from the models 430, 440 if the PES-based method is used, and the expected or estimated relative position ($y_{MACT(EST)}$) is calculated from microactuator model 430 if the relative position sensing method is used. The difference (DIFF) is then tested to see if it is within pre-determined bounds (block 520). If yes, the control continues (block 505).

If DIFF is outside the bounds, this indicates potential failure of the microactuator 200. Once a potential failure of the secondary actuator has been detected the servo control processor 400 recalls the stable VCM controller 420 (FIG. 5) from memory (block 525). The processor sends a crash stop signal to the VCM 110 to move the head to the far inner diameter of the disk. The VCM 110 is then biased so that it maintains its position at the inner diameter with the ID crash stop 102 compressed (block 530). In this way, the position of the VCM is essentially fixed. Because the VCM is biased against the crash stop, the effects of other sources of error are virtually eliminated. This is a safe and accurate way to determine the motion of the microactuator in a condition that is virtually isolated from the VCM. The operation then moves to the steps described in flow chart portion 600.

Referring to portion 600, the secondary-actuator static characteristics measurement is performed (block 605). With the position of the VCM 110 biased against the ID crash stop, a test signal is applied to the microactuator 200 to calculate its stroke. At the check point (block 610) if the stroke is two low or too high, as compared to predetermined acceptable stroke values, then the secondary actuator has failed. The secondary actuator is disabled by selecting the VCM-only controller and an error is posted to the disk drive system (block 615). If the calculated stroke meets the acceptable criteria, then the secondary-actuator dynamic characteristics measurement is started (block 620).

The secondary actuator dynamic characteristics measurement measures the secondary actuator plant frequency response. At the check point (block 625) if the measured response is significantly different from the expected result, then the secondary actuator is disabled by selecting the VCM-only controller and an error is posted to the disk drive system (block 630). If the measured response shows only minor changes, such as a minor gain increase or decrease, or a minor shift in the peak frequency, then the secondary actuator can be recovered from potential failure (block 635). The controller parameters are then adjusted or re-optimized (block 640). The dual-stage controller with the degraded-stability VCM controller and the new secondary actuator controller parameters is re-selected (block 505) and operation continues.

Figure 10:
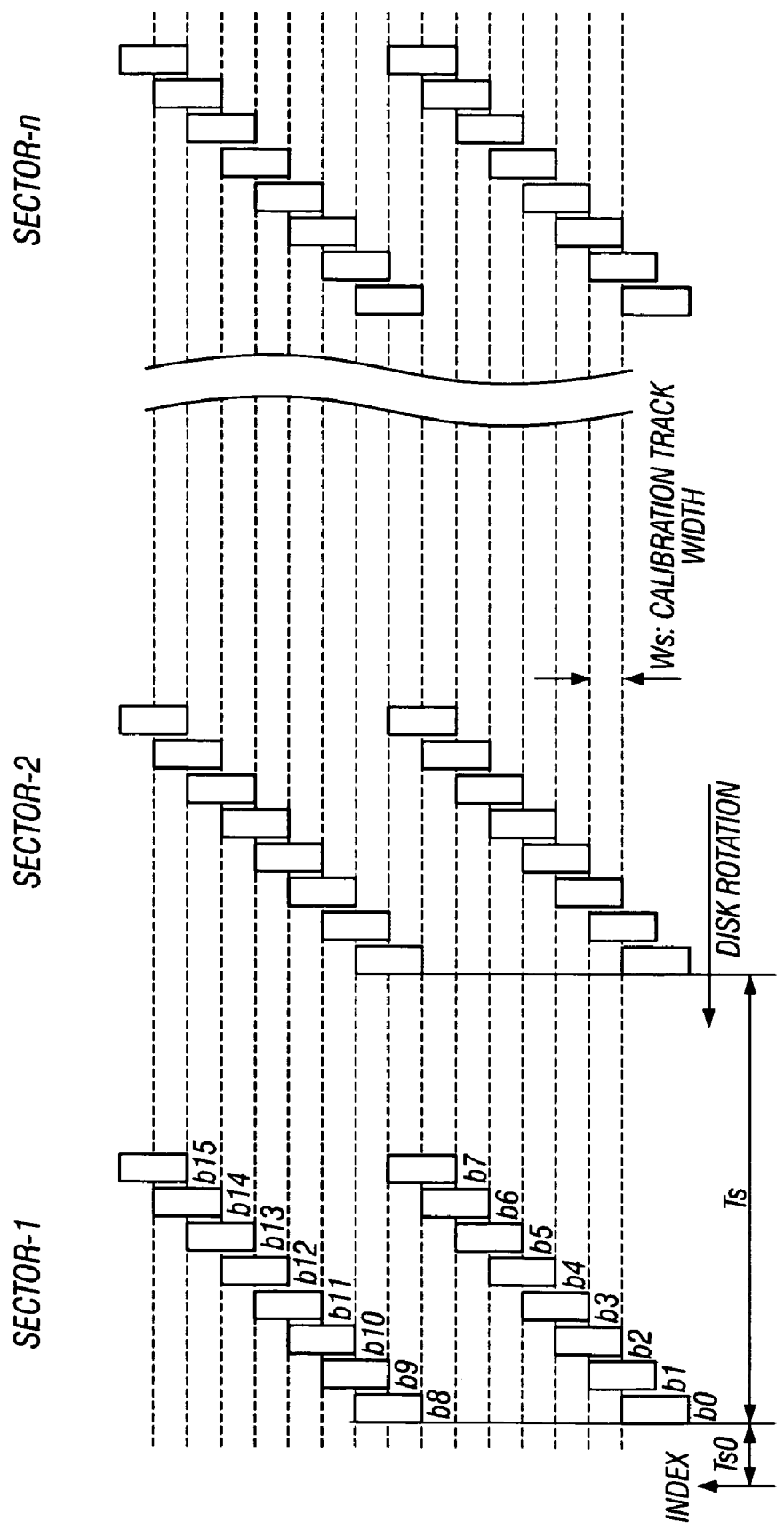
FIG. 10 shows one example of a pattern of magnetized test blocks pre-written in the calibration tracks that can be used in the secondary-actuator failure-detection and calibration test for the disk drive of this invention.

FIG. 10 shows one example of a pattern of magnetized test blocks pre-written or pre-recorded in the calibration tracks that can be used in the secondary-actuator failure detection and calibration test. The test blocks are located in radially-directed calibration tracks in a nondata band just beyond the ID of the data band. Each block can be either a discrete magnetized region if the disk is a patterned disk with patterned magnetic regions isolated from nonmagnetic regions, or a burst of high-frequency magnetic transitions if the disk is a conventional disk with a continuous magnetic recording layer. If the disk is a conventional disk, the burst pattern can be written during the servowriting process. The burst pattern is written across several tracks with interval spacing along the disk circumferential direction. The blocks are generally a constant frequency pattern. In the example of FIG. 10, the 16 bursts from calibration track 0 to calibration track 15 are arranged in angularly-spaced calibration sectors. These calibration sectors can be angularly spaced to coincide with the angular spacing of the servo sectors (see FIG. 1). Each sector is written with the same sector spacing interval, Ts, and the total number of sectors is n. The calibration track width Ws corresponds to one-half of the data track width. Eight bursts (b0 to b7) form a first group and eight bursts (b8 to b15) form a second group, with the first and second groups forming a calibration sector. This is called a 2×8 allocation pattern. Other allocation patterns are possible, such as 4×4, 4×8, 1×16, etc. The index signal can be from the disk spindle motor commutation signal and is issued once per disk rotation. The burst pattern has a fixed timing (Ts0) from the index signal.

The secondary-actuator failure detection and calibration test comprises two measurements: a measurement of the secondary actuator static characteristics and a measurement of the secondary actuator dynamic characteristics. The static characteristics measurement checks the secondary actuator movement amount per some constant first test signal, and the dynamic characteristics measurement checks the plant frequency response of the secondary actuator movement against a second test signal at one or more frequencies. In both measurements, the read head position measurement is required to calculate the secondary actuator response to the test signals.

Figure 11:
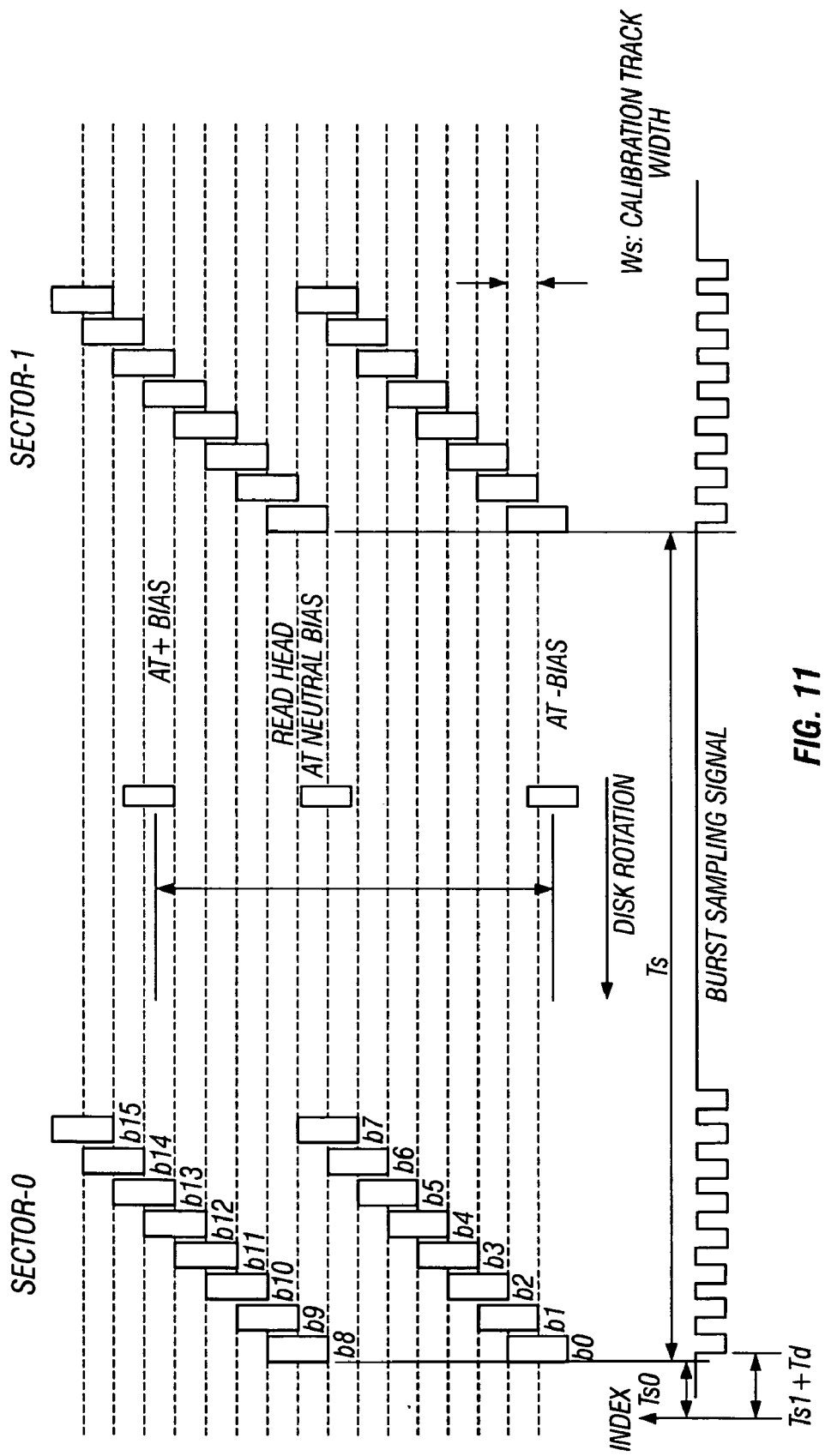
FIG. 11 shows the read head position measurement using the test block pattern of FIG. 10.

FIG. 11 shows how the read head position is measured using the burst patterns of FIG. 10. The secondary actuator input is set as the neutral bias. The read head center is moved to the center of calibration track 7 (containing bursts b7) by adjusting the VCM current, and then the VCM current is fixed during the remaining measurement process. The read back signal amplitude of burst b7 now becomes the maximum. The burst amplitudes are measured during the timing window of the burst sampling signal, which is set at a fixed timing from the index signal. The burst amplitudes are acquired at each sector. The read head position is then calculated from the burst amplitude, as will be explained below. The same measurements are performed with a positive bias and a negative bias on the secondary actuator input. Then the read head position at each bias point can be calculated as a decimal multiple of the calibration track width.

Figure 12:
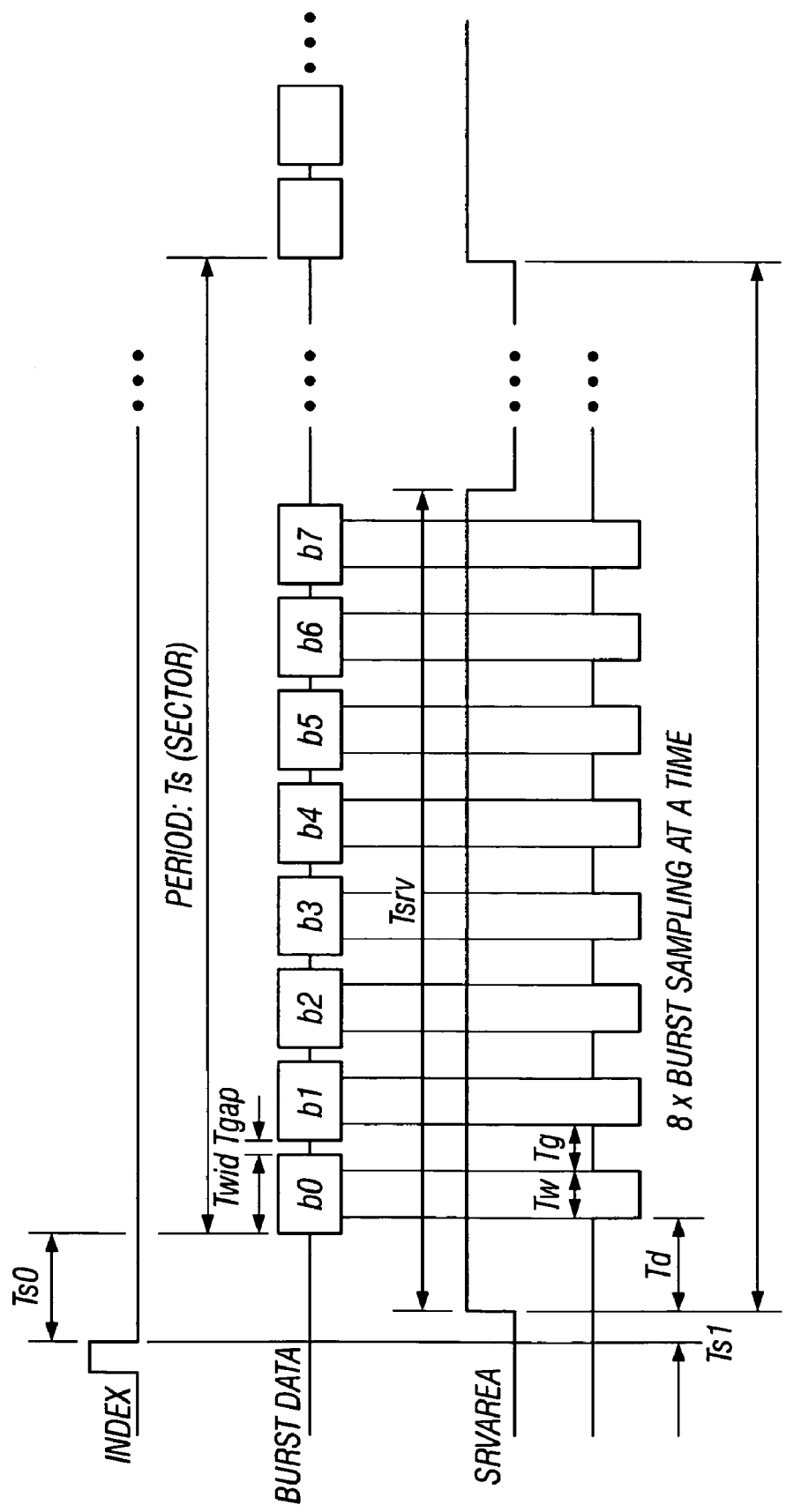
FIG. 12 shows the test block pattern demodulation timing.
Figure 13:
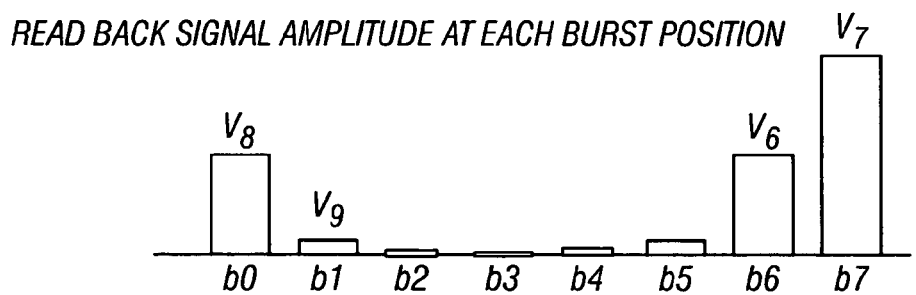
FIG. 13 shows an example of the read back signal amplitude distribution through the test blocks when the read head is located at the center of one of the calibration tracks.

FIG. 12 shows the burst pattern demodulation timing. The disk drive read/write electronics demodulates the read back signal from the burst pattern. The read back signals at all 8 bursts are demodulated. The burst pattern-sampling window is narrower than the burst pattern, so that timing is tolerant to the burst pattern circumferential error due to such effects as disk rotation jitter. FIG. 13 shows an example of the read back signal amplitude distribution through the bursts, when the read head is located at the center of burst b7. In this figure, b7 is the largest amplitude and b6 and b0 (actually b8) are almost same and half of b7. In this example, the read head position can be calculated as $$\text{Position}=7+\tfrac{1}{2}*(V8-V6)/(2*V7-V6-V8),$$

where V6, V7, V8 are the amplitudes of the read back signal at bursts b6, b7, and b8, respectively. The read head position is expressed as a decimal multiple of the calibration track width.

In this example, the read back signal at burst b8 is sampled instead of burst b0. This happens with the 2×8 allocation pattern when the read head is located at the radial boundary of each 8-burst group. A simple algorithm can be used to distinguish between bursts b0–b8, b1–b9, b2–b10, etc. For the dynamic characteristics measurement, the amplitude required of the secondary actuator input is a very small value and the secondary actuator movement is very small, typically less than one-half the calibration track width Ws, so that the initial read head position can be located at the center of burst b3 or b4.

1) Secondary Actuator Static Characteristics Measurement

Figure 14:
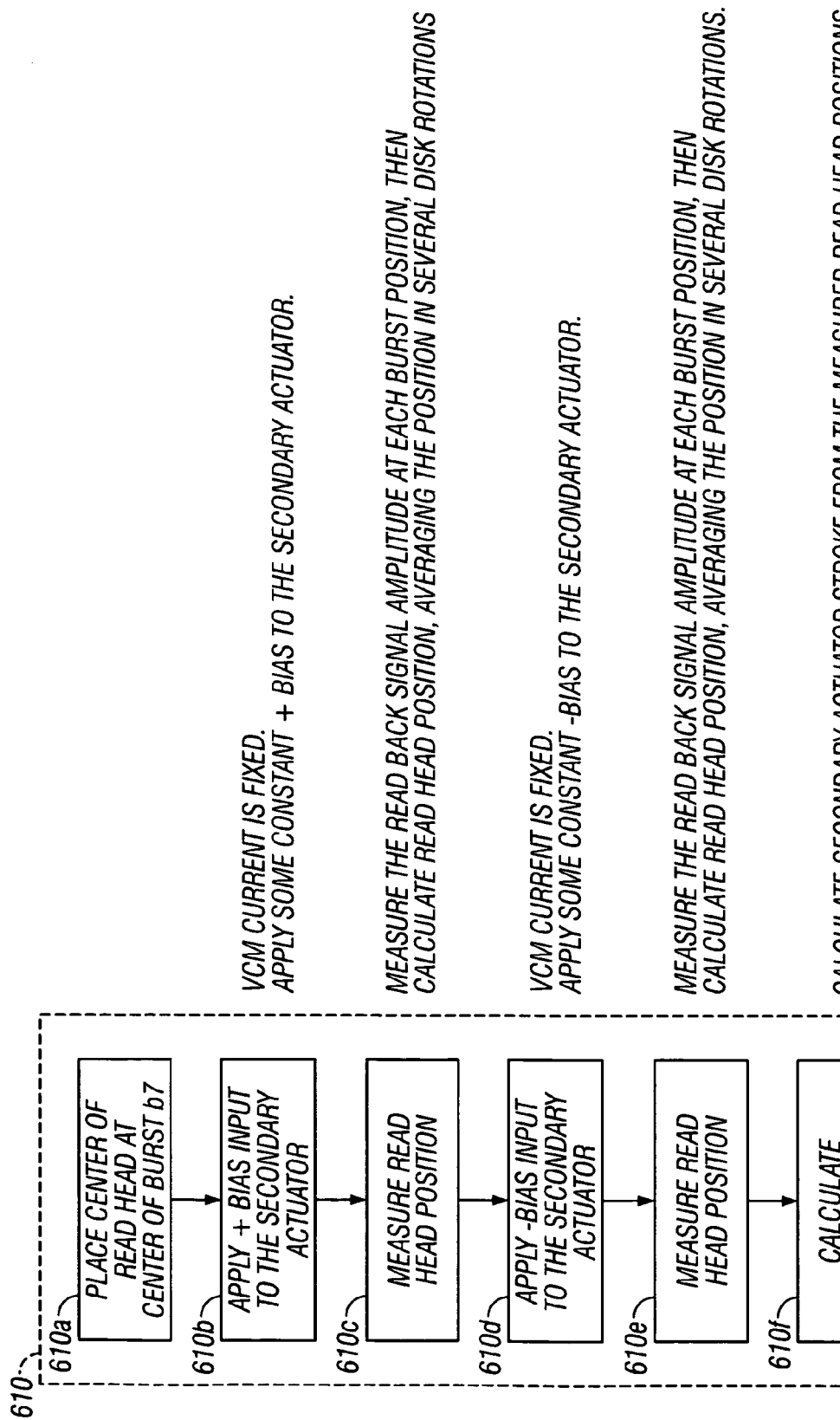
FIG. 14 is a flow chart of the details of the secondary actuator static characteristics measurement in this invention.

FIG. 14 is a flow chart showing the details of the secondary actuator static characteristics measurement (block 605 in FIG. 9). The secondary actuator input is set as a neutral bias and the read head is moved to the center of the calibration track with burst b7 by adjusting the VCM current in very small steps (block 605*a*). Next a constant input voltage is applied as a positive bias to the secondary actuator (block 605*b*) and the read head position is measured (block 605*c*) as described above. Next a constant input voltage is applied as a negative bias to the secondary actuator (block 605*d*) and the read head position is measured (block 605*e*) as described above. The measurements (blocks 605*c* and 605*e*) are done at each calibration sector and the average is calculated to get an accurate measurement. The secondary actuator stroke is then calculated (block 605*f*) as the measured movement of the read head for the known positive and negative voltage inputs. The calculated stroke is then compared with acceptable stroke values at check point 610 (FIG. 9).

2) Secondary Actuator Dynamic Characteristics Measurement

Figure 15:
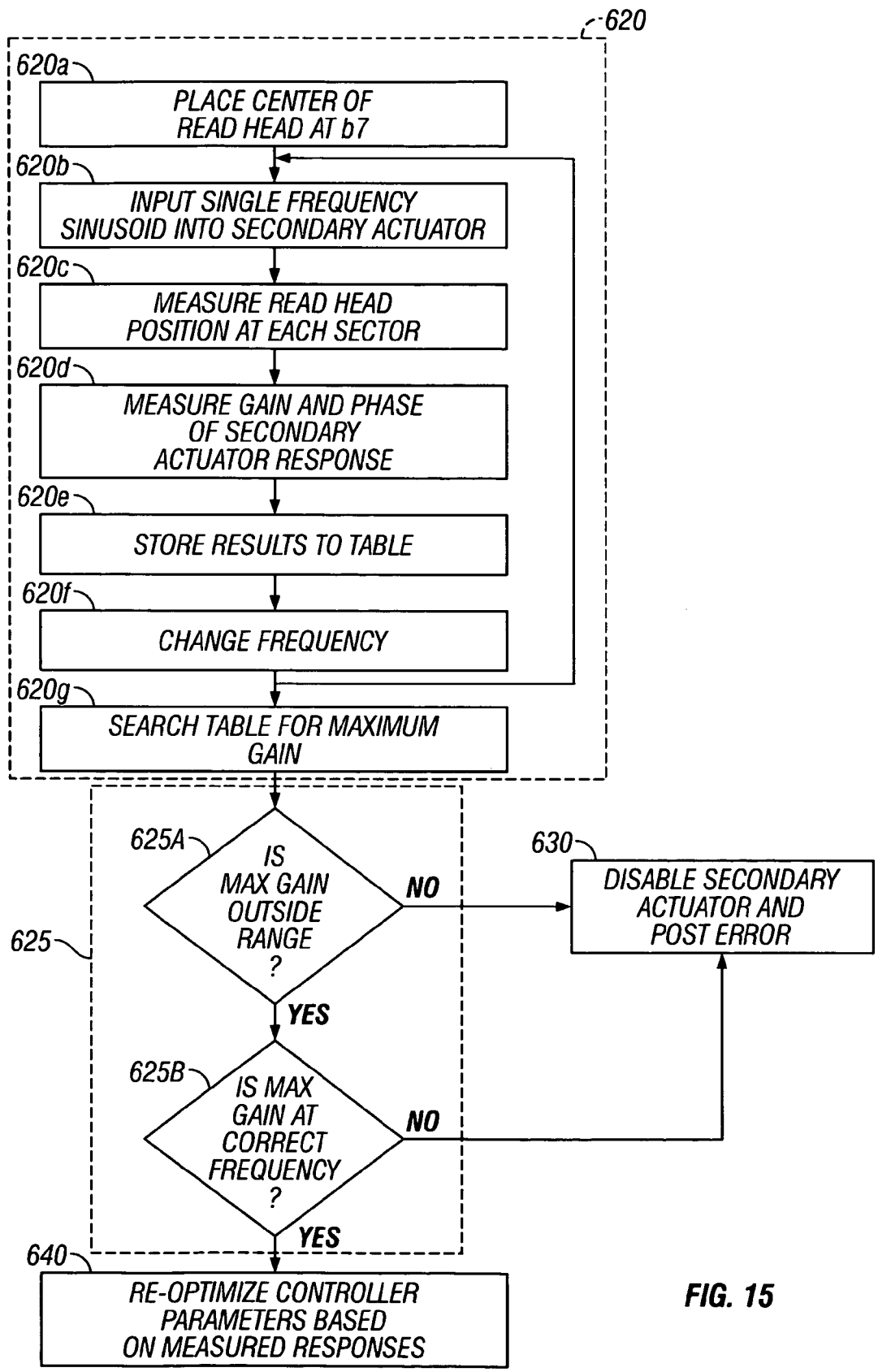
FIG. 15 is a flow chart of the details of the secondary actuator dynamic characteristics measurement in this invention.
Figure 16:
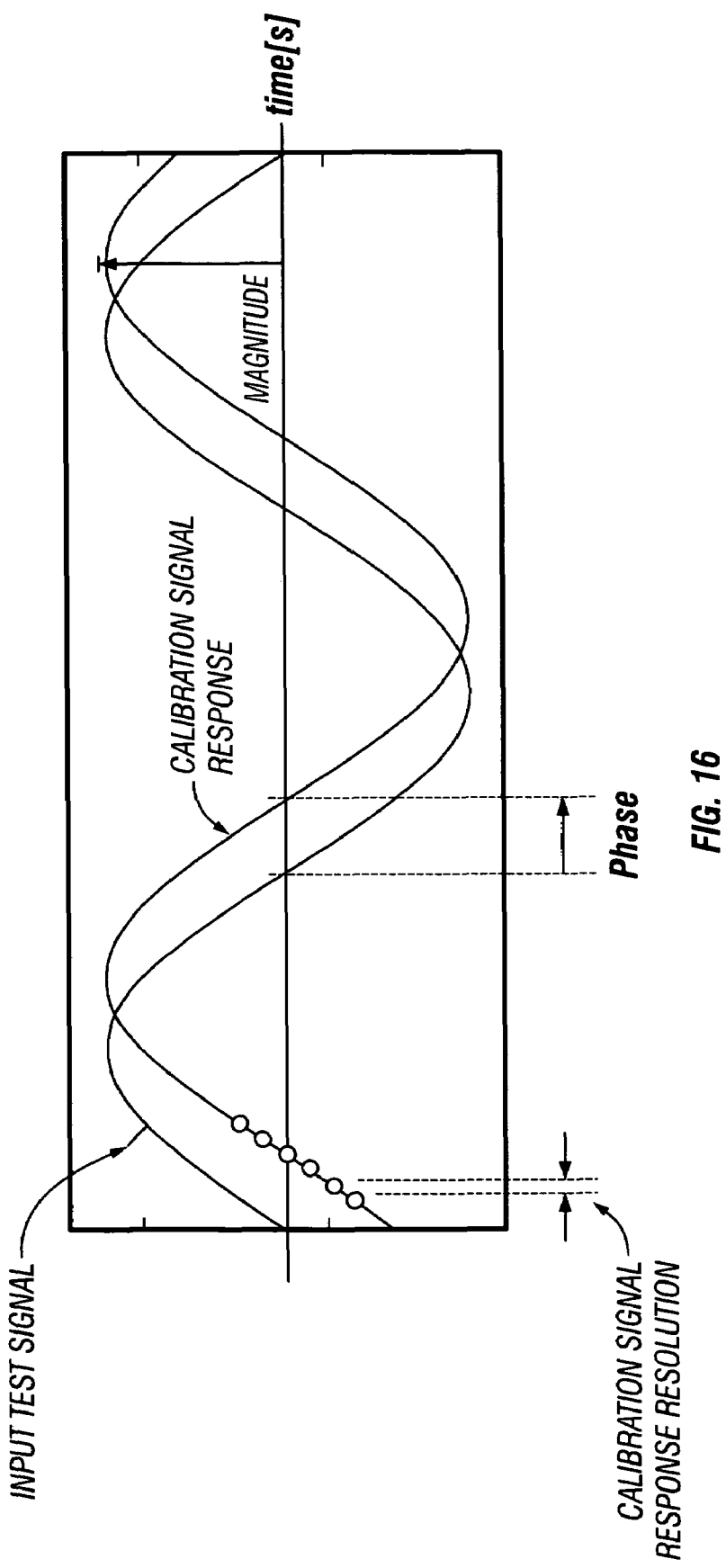
FIG. 16 shows a typical test signal at a fixed frequency and a typical calibration signal response for the measurement of the secondary actuator dynamic characteristics.

FIG. 15 is a flow chart showing the details of the secondary actuator dynamic characteristics measurement (block 620 in FIG. 9). This measurement is performed after the static characteristics measurement. The secondary actuator input is set as a neutral bias and the read head is moved to the center of the calibration track with burst b7 by adjusting the VCM current in very small steps (block 620*a*). Next the first frequency of the secondary actuator test signal is selected and a sinusoidal input is made to the secondary actuator at the first frequency (block 620*b*). Generally the amplitude of the sinusoidal input signal is held constant during the entire measurement. Then the read back signal amplitude is measured at each burst timing, and at each sector for several disk rotations (block 620*c*). FIG. 16 shows a typical test signal at a fixed frequency and a typical calibration signal response. (No units are listed on the vertical axis because FIG. 16 is intended to merely show the representative shapes for a test signal and a calibration signal response.) The circles on the calibration signal represent the measurements taken at the frequency at which the calibration sectors pass the read head. The magnitude of the calibration signal response is shown as the peak values, and the phase can be roughly calculated as the difference between the zero crossings of the test signal and the response. However, for a more accurate calculation of the gain and phase at the test signal frequency, a discrete Fourier transform (DFT) is applied to the measured read head positions at the input test signal frequency to calculate the gain and phase (block 620*d*). Then the gain and phase for that input test frequency are stored in a table (block 620*e*). The next input frequency is selected for the test signal (block 620*f*) and the process is returned to block 620*b*. The steps from blocks 620*b* to 620*f* are repeated until all desired frequencies are tested. The frequency range is generally limited to be between approximately the disk rotational frequency (1f) and one-half the sector sampling frequency. For the convenience of the DFT calculation, multiples of the disk rotational frequency may be selected. After all desired frequencies have been tested, the table is searched for the maximum gain value and its corresponding frequency (block 620*g*).

After the maximum gain value has been obtained, the check point (block 625 in FIG. 9) is performed according to the details shown in FIG. 15. The maximum gain value is checked to determine if it is within an acceptable range of predetermined values (block 625*a*). For example, if the maximum gain is too low, e.g., not at least 20 db over the static gain, this is an indication of actual failure of the microactuator (block 630 in FIG. 9). There are potential microactuator failure modes in which the motion is excessive, in which case the maximum gain value may be too high. If the maximum gain is not outside the range of acceptable gain values, then the measured frequency at which the maximum gain occurs is compared to a predetermined acceptable range (block 625*b*). For example, if the maximum gain occurs at more than 1 kHz from the known resonant frequency of the microactuator, this is an indication of actual failure of the microactuator (block 630 in FIG. 9). However, if the frequency at which the maximum gain occurs is within acceptable limits, then the controller parameters can be re-optimized (block 640 in FIG. 9). This re-optimization may take the form of a table lookout of pre-calculated parameters or may be performed in real-time through the use of an adaptive scheme. The controller may be adjusted to achieve such features as desired bandwidth or stability margins, notching of particular frequencies such as the microactuator resonance, designing for active damping of the microactuator resonance, or other performance, robustness, or stability metrics. However, if there is only a minimal or no substantial difference from the optimum values, then control can be returned to block 505 (FIG. 9) without re-optimizing the controller parameters.

Figure 17:
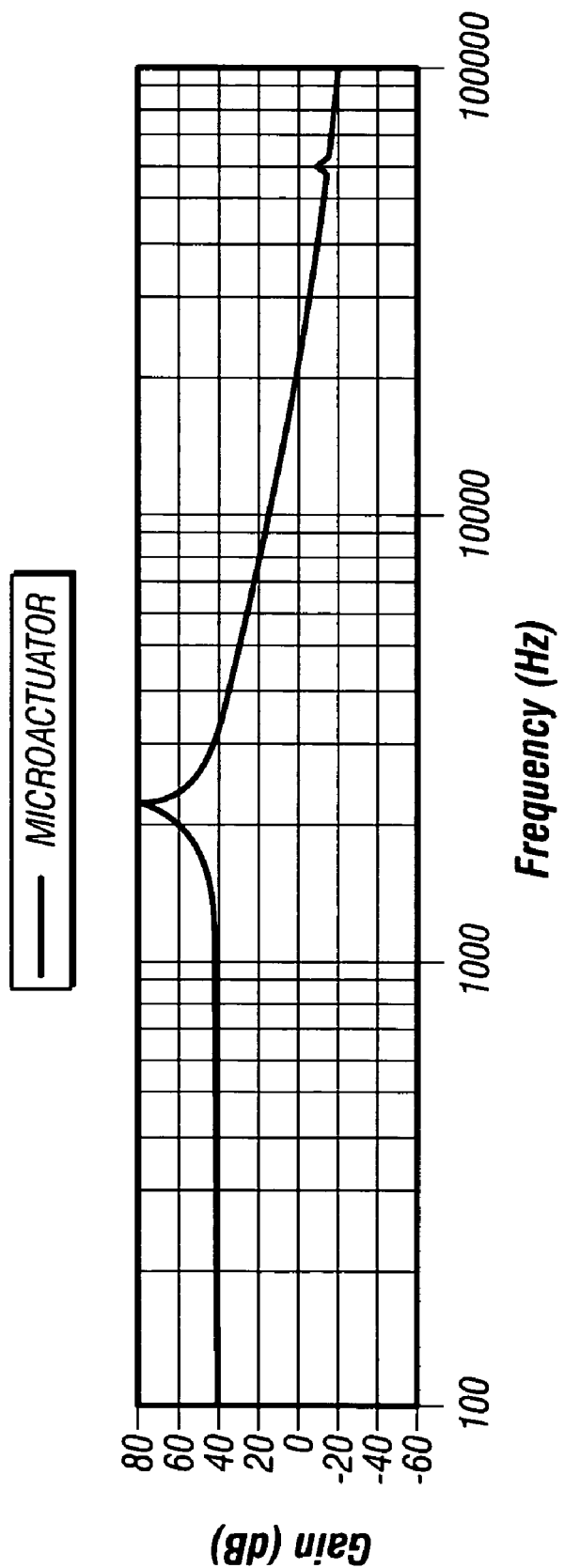
FIG. 17 is an example of the plant frequency response for a typical micro-electro-mechanical system (MEMS) type microactuator located between the suspension and the slider.

FIG. 17 shows one example of the plant frequency response for a typical micro-electro-mechanical system (MEMS) type microactuator located between the suspension and the slider. The motion of this type of microactuator is about 1 micrometer for a 30 V input at low frequency. So for the static characteristics test, a 0.5 micrometer movement would be expected for a 15 V input. If the measured output was less than about 0.2 micrometer or more than about 1 micrometer during the static characteristics measurement, then this would likely indicate failure of the microactuator. In a server class disk drive, the spindle motor frequency is between 167 Hz and 250 Hz, and the servo sector sampling frequency is currently 50 kHz or above. So for the dynamic characteristics measurement, an acceptable appropriate frequency range for the series of input test signals would be from about 200 Hz to 10 kHz. Thus as one example, the first sinusoidal test signal of FIG. 16 could be at 167 Hz with subsequent test signals increased in 167 Hz increments until the last test signal is reached at around 10 kHz. This type of microactuator also has a resonant frequency around 2 kHz, so if the maximum gain from the dynamic characteristics measurement is less than about 1 kHz or greater than about 3 kHz, then this would likely indicated failure of the microactuator.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A disk drive comprising:
   a rotatable magnetic recording disk having a plurality of concentric data tracks in a data region and a plurality of calibration tracks in a nondata region, the data tracks containing servo positioning information and the calibration tracks containing radially-spaced magnetized test blocks;
   a recording head movable across the disk, the head being capable of reading data and servo positioning information in the data tracks and detecting the test blocks in the calibration tracks;
   a primary actuator for moving the head;
   a crash stop for limiting movement of the primary actuator and located to enable the head to detect the test blocks in the calibration tracks when the primary actuator is at the crash stop;
   a secondary actuator connected to the primary actuator, the head being connected to the secondary actuator; and
   a servo control processor responsive to servo information read by the head and comprising a dual-stage controller for generating a primary actuator control signal and a secondary actuator control signal, the processor capable of sending a crash stop signal to the primary actuator for moving the primary actuator to the crash stop and, when the primary actuator is at the crash stop, generating a test signal to the secondary actuator and receiving a calibration signal from the test blocks in response to the test signal.

2. The disk drive of claim 1 wherein the amount of movement of the head across the calibration tracks as a function of test signal value is the stroke of the secondary actuator, and wherein the processor calculates the stroke.

3. The disk drive of claim 2 wherein the processor generates a failure signal if the calculated stroke is outside a predetermined stroke range.

4. The disk drive of claim 1 wherein the test signal covers a range of frequencies and the calibration signal is used to generate a frequency response.

5. The disk drive of claim 4 wherein the processor records the gains and corresponding frequencies of the calibration signal frequency response.

6. The disk drive of claim 5 wherein the processor generates a failure signal if a recorded gain is outside a predetermined range of values.

7. The disk drive of claim 5 wherein the processor modifies the parameters of the controller from the recorded gains and corresponding frequencies.

8. The disk drive of claim 4 wherein the processor also records the phases of the calibration signal frequency response.

9. The disk drive of claim 1 wherein the dual-stage controller comprises a degraded-stability primary actuator controller having relatively high low-frequency open-loop gain, and a selectable single-stage controller for generating only a primary actuator control signal.

10. The disk drive of claim 9 wherein the servo control processor includes a model of the dynamic response of the primary actuator and a model of the dynamic response of the secondary actuator, the models providing a modeled head-position output when the control signals from the dual-stage controller are input to the models.

11. The disk drive of claim 10 wherein the single-stage controller is selected by the processor when the difference between the modeled head-position output and the measured head-position from the servo information detected by the head is greater than a predetermined value, and wherein the processor sends a crash stop signal to the primary actuator when the single-stage controller is selected.

12. The disk drive of claim 10 further comprising a secondary-actuator relative-position sensor coupled to the servo control processor and wherein the secondary-actuator model provides a modeled output of the position of the secondary actuator relative to the primary actuator when the secondary actuator control signal from the dual-stage controller is input to the secondary-actuator model, wherein the single-stage controller is selected by the processor when the difference between the modeled secondary-actuator relative position and the measured relative secondary actuator position from the relative-position sensor is greater than a predetermined value, and wherein the processor sends a crash stop signal to the primary actuator when the single-stage controller is selected.

13. The disk drive of claim 1 wherein the secondary actuator is an electrostatic microactuator.

14. The disk drive of claim 1 wherein the secondary actuator is a piezoelectric actuator.

15. A disk drive comprising:
a rotatable magnetic recording disk having a plurality of concentric data tracks in a data band and a plurality of calibration tracks in a nondata band, the data tracks containing servo positioning information and the calibration tracks containing a pattern of radially-spaced magnetized test blocks;
a recording head movable across the disk, the head being capable of reading data and servo positioning information in the data tracks and detecting the test blocks in the calibration tracks;
a voice-coil-motor (VCM) for moving the head;
a crash stop for limiting movement of the VCM and located to enable the head to detect the test blocks in the calibration tracks when the VCM is at the crash stop;
a microactuator connected to the VCM, the head being connected to the microactuator; and
a servo control processor responsive to servo information read by the head and comprising (a) a dual-stage controller having a degraded-stability VCM controller with relatively high low-frequency gain and a microactuator controller for simultaneously generating a VCM control signal and a microactuator control signal, and (b) a selectable single-stage controller for generating only a VCM control signal, the processor being capable of generating a test signal to the microactuator and receiving a head calibration signal from the test blocks in response to the test signal when the single-stage controller is selected and the VCM is at the crash stop.

16. The disk drive of claim 15 wherein the servo control processor includes a model of the dynamic response of the VCM and a model of the dynamic response of the microactuator, the models providing a modeled head-position output when the control signals from the dual-stage controller are input to the models.

17. The disk drive of claim 16 wherein the single-stage controller is selected by the processor when the difference between the modeled head-position output and the measured head position from the servo information read by the head is greater than a predetermined value.

18. The disk drive of claim 17 wherein the amount of movement of the head across the calibration tracks as a function of test signal value is the stroke of the secondary actuator, and wherein the processor calculates the stroke.

19. The disk drive of claim 18 wherein the processor generates a failure signal if the calculated stroke is outside a predetermined stroke range.

20. The disk drive of claim 17 wherein the test signal covers a range of frequencies and the calibration signal is used to generate a frequency response.

21. The disk drive of claim 20 wherein the processor records the gains and corresponding frequencies of the calibration signal frequency response.

22. The disk drive of claim 21 wherein the processor generates a failure signal if a recorded gain is outside a predetermined range of values.

23. The disk drive of claim 21 wherein the processor modifies the parameters of the controller from the recorded gains and corresponding frequencies.

24. The disk drive of claim 21 wherein the processor also records the phases of the calibration signal frequency response.

25. The disk drive of claim 16 further comprising a microactuator relative-position sensor coupled to the servo control processor and wherein the microactuator model provides a modeled output of the position of the microactuator relative to the VCM when the microactuator control signal from the dual-stage controller is input to the microactuator model, and wherein the single-stage controller is selected by the processor when the difference between the modeled microactuator relative position and the measured relative microactuator position from the relative-position sensor is greater than a predetermined value.

26. The disk drive of claim 25 wherein the amount of movement of the head across the calibration tracks as a function of test signal value is the stroke of the secondary actuator, and wherein the processor calculates the stroke.

27. The disk drive of claim 26 wherein the processor generates a failure signal if the calculated stroke is outside a predetermined stroke range.

28. The disk drive of claim 25 wherein the test signal covers a range of frequencies and the calibration signal is used to generate a frequency response.

29. The disk drive of claim 28 wherein the processor records the gains and corresponding frequencies of the calibration signal frequency response.

30. The disk drive of claim 29 wherein the processor generates a failure signal if a recorded gain is outside a predetermined range of values.

31. The disk drive of claim 29 wherein the processor modifies the parameters of the controller from the recorded gains and corresponding frequencies.

32. The disk drive of claim 29 wherein the processor also records the phases of the calibration signal frequency response.

33. The disk drive of claim 15 wherein the microactuator is an electrostatic microactuator.

34. The disk drive of claim 15 wherein the microactuator is a piezoelectric microactuator.

35. A method for operating a dual-stage actuator disk drive, the disk drive including (a) a rotatable magnetic recording disk having a plurality of concentric data tracks in a data band and a plurality of calibration tracks in a nondata band, the data tracks containing servo positioning information and the calibration tracks containing a pattern of radially-spaced magnetized test blocks; (b) a recording head movable across the disk, the head being capable of reading data and servo positioning information in the data tracks and detecting the test blocks in the calibration tracks; (c) a voice-coil-motor (VCM) for moving the head; (d) a crash stop for limiting movement of the VCM and located to enable the head to detect the test blocks in the calibration tracks when the VCM is at the crash stop; (e) a microactuator connected to the VCM, the head being connected to the microactuator; and (f) a servo control processor responsive to servo information read by the head and comprising (i) a dual-stage controller having a degraded-stability VCM controller with relatively high low-frequency gain and a microactuator controller for simultaneously generating a VCM control signal and a microactuator control signal, and (ii) a selectable single-stage controller for generating only a VCM control signal, the processor-implemented method comprising:
　　detecting a potential failure of the microactuator;
　　generating a crash stop signal to the VCM to move the VCM to the crash stop and selecting the single-stage controller if a potential microactuator failure is detected;
　　generating a first test signal to the microactuator;
　　receiving a head calibration signal from the test blocks in response to the first test signal;
　　measuring the position of the head from the received calibration signal;
　　calculating the stroke of the microactuator from the first test signal and the measured head position; and
　　posting a microactuator failure signal if the calculated stroke is outside a predetermined stroke range.

36. The method of claim 35 further comprising, if the calculated stroke is within the predetermined range, generating a series of second test signals to the microactuator, each of the second test signals in the series being at a frequency different from the other second test signals in the series; receiving a series of second calibration signals in response to the series of second test signals; recording the gains and corresponding frequencies from each of the second calibration signals; and posting a microactuator failure signal if the maximum recorded gain is outside a predetermined range.

37. The method of claim 36 further comprising, if the maximum recorded gain is within a predetermined range, posting a microactuator failure signal if the maximum recorded gain is at a recorded frequency outside a predetermined frequency range.

38. The method of claim 36 further comprising, if the maximum recorded gain is at a recorded frequency within said predetermined frequency range, modifying the parameters of the controller from the recorded gains and corresponding frequencies.

39. The method of claim 35 further comprising, if the calculated stroke is within the predetermined range, generating a series of second test signals to the microactuator, each of the second test signals in the series being at a frequency different from the other second test signals in the series; receiving a series of second calibration signals in response to the series of second test signals; and recording the phases and corresponding frequencies from each of the second calibration signals.

40. The method of claim 35 wherein the servo control processor also includes a model of the dynamic response of the VCM and a model of the dynamic response of the microactuator, and wherein the processor-implemented method further comprises:
　　providing a modeled head-position output when the control signals from the dual-stage controller are input to the models; and wherein detecting a potential failure of the microactuator comprises determining if the difference between the modeled head-position output and the measured head position from the servo information read by the head is greater than a predetermined value.

41. The method of claim 35 wherein the disk drive also includes a microactuator relative-position sensor coupled to the servo control processor and the servo control processor also includes a model of the dynamic response of the microactuator, and wherein the processor-implemented method further comprises:
　　providing a modeled output of the position of the microactuator relative to the VCM when the microactuator control signal from the dual-stage controller is input to the microactuator model; and wherein detecting a potential failure of the microactuator comprises determining if the difference between the modeled microactuator relative position and the measured relative microactuator position from the relative-position sensor is greater than a predetermined value.

* * * * *